US012783202B2

(12) United States Patent
Wang

(10) Patent No.: US 12,783,202 B2
(45) Date of Patent: Nov. 3, 2026

(54) TERMINAL, SYSTEM AND METHOD FOR SCREEN PROJECTION, STORAGE MEDIUM, AND ELECTRONIC DEVICE

(71) Applicant: BOE TECHNOLOGY GROUP CO., LTD., Beijing (CN)

(72) Inventor: Ran Wang, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 18/710,892

(22) PCT Filed: Jun. 30, 2022

(86) PCT No.: PCT/CN2022/103050

§ 371 (c)(1),
(2) Date: May 16, 2024

(87) PCT Pub. No.: WO2024/000487

PCT Pub. Date: Jan. 4, 2024

(65) Prior Publication Data

US 2025/0013419 A1 Jan. 9, 2025

(51) Int. Cl.
*G06F 3/14* (2006.01)
*G06F 3/0488* (2022.01)

(52) U.S. Cl.
CPC .......... *G06F 3/1454* (2013.01); *G06F 3/0488* (2013.01)

(58) Field of Classification Search
CPC ........ G06F 3/1454; G06F 3/0488; G06F 3/14; G06F 3/1423; G06F 9/451
See application file for complete search history.

(56) References Cited

U.S. PATENT DOCUMENTS

2019/0227820 A1 7/2019 Wang et al.
2020/0117350 A1* 4/2020 Zhu ........................ G06F 9/451
(Continued)

FOREIGN PATENT DOCUMENTS

CN 102243571 A 11/2011
CN 107766099 A 3/2018
(Continued)

OTHER PUBLICATIONS

International Search Report of PCT application No. PCT/CN2022/103050 dated Jan. 18, 2023.
(Continued)

*Primary Examiner* — David D Davis
(74) *Attorney, Agent, or Firm* — Calfee, Halter & Griswold LLP

(57) ABSTRACT

A first terminal configured for screen projection is provided and includes a first processor and a first display screen. The first processor is configured for generating a first display interface, and controlling the first display screen to display the first display interface. The first processor is further configured for creating a virtual display screen. The first processor is further configured for creating a second display interface, and controlling the virtual display screen to display the second display interface. The first processor is further configured for projecting to a second terminal the second display interface corresponding to the virtual display screen, thereby causing the second terminal to display the second display interface.

18 Claims, 14 Drawing Sheets

(56) References Cited

U.S. PATENT DOCUMENTS

| | | | | |
|---|---|---|---|---|
| 2020/0192564 | A1* | 6/2020 | Zhu | H04N 5/74 |
| 2021/0084136 | A1* | 3/2021 | Zhao | H04L 67/06 |
| 2021/0263642 | A1* | 8/2021 | Li | G06F 3/0486 |
| 2022/0147228 | A1* | 5/2022 | Yi | G06F 3/04883 |

FOREIGN PATENT DOCUMENTS

| | | | |
|---|---|---|---|
| CN | 109791498 | A | 5/2019 |
| CN | 109947508 | A | 6/2019 |
| CN | 110515579 | A | 11/2019 |
| CN | 111045772 | A | 4/2020 |
| CN | 111432070 | A | 7/2020 |
| CN | 112202967 | A | 1/2021 |
| CN | 112905289 | A | 6/2021 |
| WO | 2018050095 | A1 | 3/2018 |

OTHER PUBLICATIONS

Written Opinion of PCT application No. PCT/CN2022/103050 dated Jan. 18, 2023.

First Office Action of CN application No. 2022800020864 dated May 9, 2026.

* cited by examiner

TERMINAL, SYSTEM AND METHOD FOR SCREEN PROJECTION, STORAGE MEDIUM, AND ELECTRONIC DEVICE

CROSS-REFERENCE TO RELATED APPLICATION

The present application is the U.S. National Stage of International Application No. PCT/CN2022/103050, filed on Jun. 30, 2022, the contents of which are incorporated herein by reference in their entireties for all purposes.

TECHNICAL FIELD

The present disclosure relates to the field of display technology, and in particular to a first terminal, system and method configured for screen projection, a computer-readable storage medium, and an electronic device.

BACKGROUND

With the development of the field of display technology, large-size terminals have appeared.

In related arts, only one display interface is generally displayed on the large-size terminal, which makes the large-size terminal not effectively utilized, in addition to which, when it is required to change the content played on the large-size terminal, it is necessary to interrupt the display of the content of the large-size terminal, which results in a lower degree of viewing experience for the user.

In view of this, there is an urgent need in this field to develop a new screen projection control method and device.

It should be illustrated that the information disclosed in the above-described background section is only used for enhancing the understanding of the background of the present disclosure, and thus may include information that does not constitute prior art known to those ordinary skilled in the art.

SUMMARY

An object of the present disclosure is to provide a screen projection control terminal, system and method, a computer-readable storage medium, and an electronic device, thereby overcoming, at least to a certain extent, the problem of low viewing experience of the user due to related arts.

Other features and advantages of the present disclosure will become apparent through the following detailed description, or will be learned in part through the practice of the present disclosure.

According to a first aspect of embodiments of the present disclosure, a first terminal configured for screen projection is provided. The first terminal includes a first processor and a first display screen, and the first terminal is communicatively connected to a second terminal. The first processor is configured for: generating a first display interface, and controlling the first display screen to display the first display interface The first processor is further configured for: creating a virtual display screen; creating a second display interface, and controlling the virtual display screen to display the second display interface. The first processor is further configured for: projecting to the second terminal the second display interface corresponding to the virtual display screen, thereby causing the second terminal to display the second display interface.

According to a second aspect of the embodiments of the present disclosure, a second terminal configured for screen projection is provided. The second terminal includes a second processor and a second display screen, the second terminal is communicatively connected to a first terminal, and the second processor is configured for: receiving a second display interface projected to the second terminal, and displaying the second display interface, where the second display interface is displayed on a virtual display screen, the virtual display screen is created by a first processor, and the first processor further generates a first display interface and controls a first display screen to display the first display interface.

According to a third aspect of the embodiments of the present disclosure, a screen projection control method is provided, and is applied to a first terminal. The first terminal includes a first display screen, the first terminal is communicatively connected to a second terminal, and the method includes: generating a first display interface, and controlling the first display screen to display the first display interface; creating a virtual display screen; creating a second display interface, and controlling the virtual display screen to display the second display interface; and projecting to the second terminal the second display interface corresponding to the virtual display screen, thereby causing the second terminal to display the second display interface.

According to a fourth aspect of the embodiments of the present disclosure, an electronic device is provided. The electronic device includes a processor and a memory, where the memory stores a computer-readable instruction, and the computer-readable instruction, when executed by the processor, implements the screen projection control method of any one of the exemplary embodiments.

As can be seen from the above technical solutions, the screen projection control method, the screen projection control device, the computer storage medium, and the electronic device in the exemplary embodiments of the present disclosure at least have the following advantages and positive effects.

In the method and device provided in the exemplary embodiments of the present disclosure, on the one hand, the first display screen is controlled to display the first display interface, the virtual display screen is created, and the virtual display screen is controlled to display the second display interface. The existence of the first display screen and the virtual display screen in the first terminal improves the utilization of the screen of the first terminal. On the other hand, the second display interface corresponding to the virtual display screen is projected to the second terminal, so that when the content displayed in the first terminal is changed, the user can see in the second terminal the second display interface that is displayed on the virtual display screen, and the display of the content of the interface cannot be interrupted, optimizing the user's viewing experience.

It should be understood that the above general description and the later detailed description are only exemplary and explanatory and cannot limit the present disclosure.

BRIEF DESCRIPTION OF THE DRAWINGS

The accompanying drawings herein are incorporated into and form a part of the specification, illustrate embodiments consistent with the present disclosure, and are used in conjunction with the specification to explain the principles of the present disclosure. It is apparent that the accompanying drawings in the following description are only some of the embodiments of the present disclosure, and that other drawings may be obtained from these drawings by those ordinary skilled in the art without creative labor.

DETAILED DESCRIPTION

Figure 1:
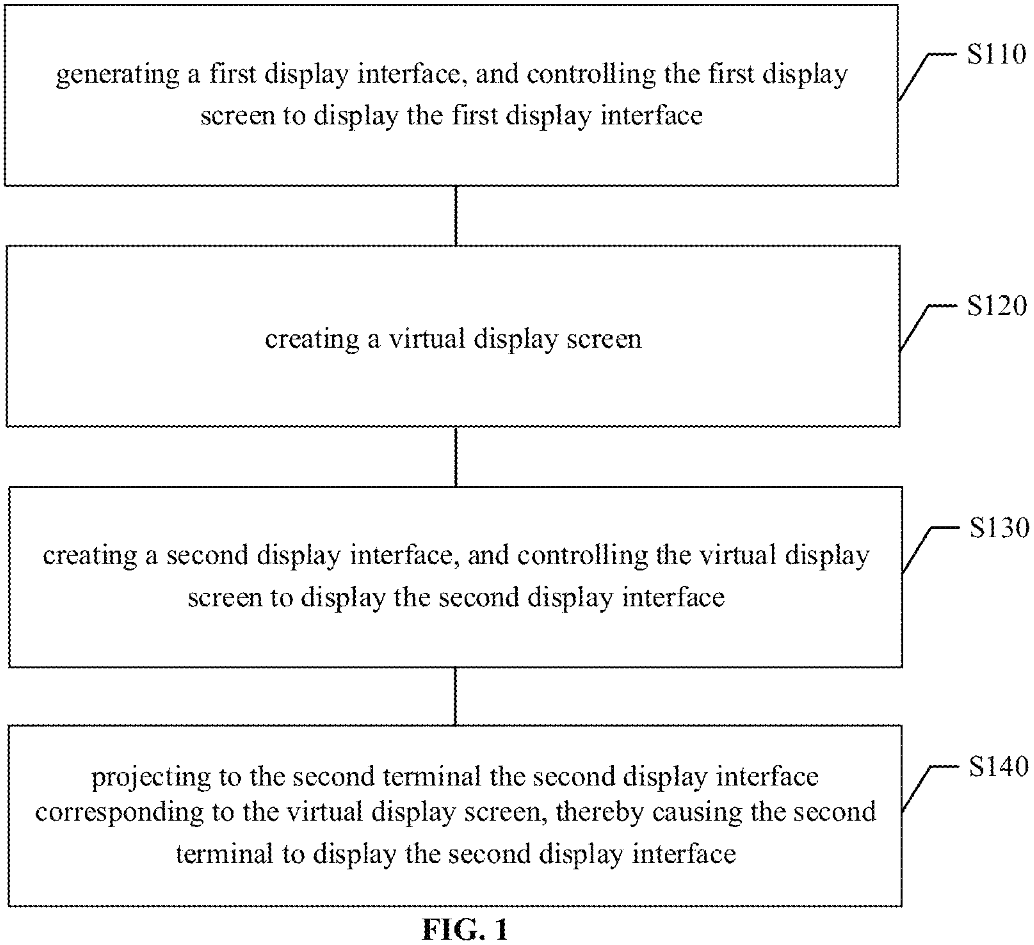
FIG. 1 schematically illustrates a flow diagram of a first terminal configured for screen projection in an embodiment of the present disclosure.

Example embodiments are now described more comprehensively with reference to the accompanying drawings. However, the example embodiments are capable of being implemented in a variety of forms and should not be construed as being limited to the examples set forth herein. Rather, the provision of these embodiments allows for the present disclosure to be more comprehensive and complete and conveys the idea of the example embodiments in a comprehensive manner to those skilled in the art. The described features, structures, or characteristics may be combined in one or more embodiments in any suitable manner. In the following description, many specific details are provided thereby giving a full understanding of the embodiments of the present disclosure. However, those skilled in the art will realize that it is possible to practice the technical solutions of the present disclosure and omit one or more of the particular details described, or that other methods, components, devices, steps, etc. may be used. In other cases, the well-known technical solutions are not shown or described in detail to avoid overshadowing and obscuring aspects of the present disclosure.

The terms “a”, “an”, “the”, and “said” are used to indicate an existence of one or more elements/components/etc.; and the terms “include” and “have” are used to indicate an open-ended inclusion and mean that there may be additional elements/components/etc. in addition to the listed elements/ components/etc. The terms “first” and “second”, etc. are used merely as markers and not as quantitative limitations to the objects thereof.

Furthermore, the accompanying drawings are only schematic illustrations of the present disclosure and are not necessarily drawn to scale. The same reference numerals in the drawings indicate the same or similar parts, and thus repeated descriptions of them will be omitted. Some of the block diagrams shown in the accompanying drawings are functional entities and do not necessarily have to correspond to physically or logically separate entities.

In response to the problem in the related arts, the present disclosure proposes a first terminal configured for screen projection. FIG. 1 illustrates a flow diagram of projecting a second display interface to a second terminal by a first processor. As shown in FIG. 1, the first processor projecting the second display interface to the second terminal at least includes the following steps S110 to S140.

At step S110, a first display interface is generated, and a first display screen is controlled to display the first display interface.

At step S120, a virtual display screen is created.

At step S130, a second display interface is created, and the virtual display screen is controlled to display the second display interface.

At step S140, the second display interface corresponding to the virtual display screen is projected to the second terminal, thereby causing the second terminal to display the second display interface.

In the method and device provided in the exemplary embodiments of the present disclosure, on the one hand, the first display screen is controlled to display the first display interface, the virtual display screen is created, and the virtual display screen is controlled to display the second display interface. The existence of the first display screen and the virtual display screen in the first terminal improves the utilization of the screen of the first terminal. On the other hand, the second display interface corresponding to the virtual display screen is projected to the second terminal, so that when the content displayed in the first terminal is changed, the user can see in the second terminal the second display interface that is displayed on the virtual display screen, and the display of the content of the interface cannot be interrupted, optimizing the user’s viewing experience.

The following provides a detailed explanation of steps of the screen projection control method.

In step S110, the first display interface is generated, and the first display screen is controlled to display the first display interface.

In an exemplary embodiment of the present disclosure, the first terminal refers to a terminal that is controlled. Typically, the first terminal may be a terminal having a large-size screen. The second terminal refers to a terminal that controls the first terminal. Typically, the second terminal may be a mobile terminal. Specifically, the second terminal may be a cell phone terminal, or may be a tablet terminal, and this exemplary embodiment does not make any special limitations on this.

The first terminal includes the first processor and the first display screen, and the second terminal includes a second processor and a second display screen. The first display interface refers to an interface that is displayed on the first display screen. Specifically, the first display interface includes an activity, the activity refers to a visualizing user interface, the user interface is specifically composed of multiple views stacked together, and a user interface (UI) component is placed on the user interface for user interaction.

Assuming that the user opens an application software at this time, the interface that is seen by the user is exactly an activity, and when a hyperlink on that interface is clicked on, the current interface may switch to another interface, i.e., switch to a new activity.

The first display interface may be any interface that is required to be displayed on the first display screen by the user, and this exemplary embodiment does not make any special limitations on this.

By way of example, generating a management interface corresponding to an application A refers to generating the first display interface, and displaying on the first display screen the management interface corresponding to the application A.

In this exemplary embodiment, the first display screen is controlled to display the first display interface, which lays a foundation for subsequently displaying different display interfaces on different display screens.

In step S120, the virtual display screen is created.

In this exemplary embodiment of the present disclosure, the virtual display screen refers to another screen that is created by the first processor to be different from the first display screen. It is worth stating that the virtual display screen created at this time is not visible to the user. Moreover, while creating the virtual display screen, the first processor may assign to the virtual display screen a screen identification B and a storage identification b corresponding to the screen identification B. In addition, before creating the virtual display screen, the first processor may also assign to the first display screen a screen identification A and a storage identification b corresponding to the screen identification A.

The storage identification is used for marking different storage areas, and by storing different screen data in different storage areas, different display interfaces may be realized to be displayed on the first display screen and the virtual display screen respectively.

For example, if the first terminal is an Android system, a DisplayManager component (a screen management component) may be utilized to create the virtual display screen.

In an optional embodiment, in creating the virtual display screen, the first processor is configured for creating the virtual display screen in response to a screen creation operation acting on the first display screen.

The screen creation operation refers to an operation for creating the virtual display screen, and the operation may be an operation of the user acting on the first display screen. Specifically, the screen creation operation may be a click operation, a double-click operation, or a long-press operation, and this exemplary embodiment does not make any special limitations on this.

For example, in response to a double-click operation acting on an application B on the first display screen, a function SurfaceControl.createDisplay( ) is utilized to create the virtual display screen.

In this exemplary embodiment, the screen creation operation may be an operation acting on the first display screen. The user may realize the creation of the virtual display screen by touching the first display screen, which increases flexibility of creating the virtual display screen.

In an optional embodiment, in creating the virtual display screen, the first processor is configured for receiving a screen creation instruction sent by the second terminal, and creating the virtual display screen based on the screen creation instruction.

Herein, the screen creation instruction may also be sent by the second terminal to the first terminal.

For example, when the user acts a click operation on a creation control of the second terminal, the screen creation instruction corresponding to the operation is sent to the first terminal at this time. After receiving the screen creation instruction, the first terminal creates the virtual display screen.

In this exemplary embodiment, the screen creation instruction may be sent by the second terminal to the first terminal, which not only realizes the creation of the virtual display screen, but also increases the flexibility of creating the virtual display screen.

Figure 2:
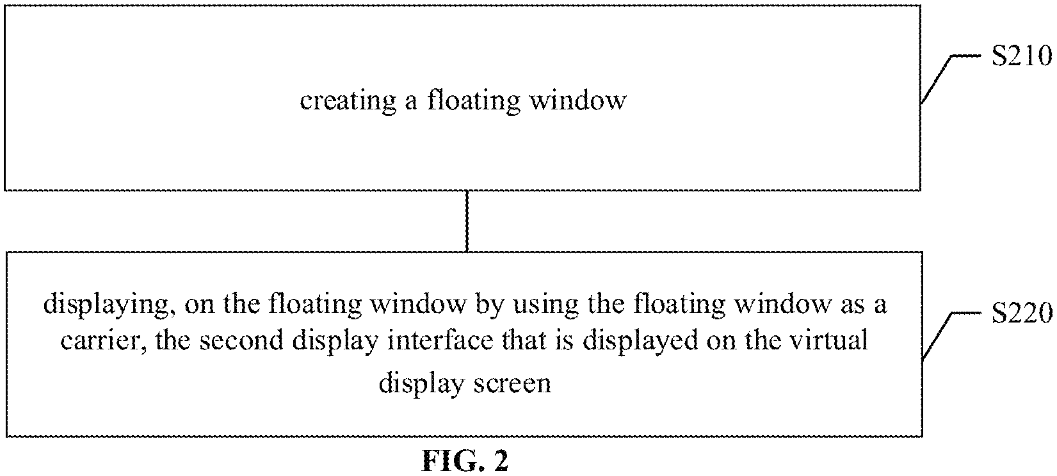
FIG. 2 schematically illustrates a flow diagram of a process after a virtual display screen is created in a first terminal configured for screen projection in an embodiment of the present disclosure.

In an optional embodiment, FIG. 2 illustrates a flow diagram of a process after a virtual display screen is created in a first terminal configured for screen projection. As shown in FIG. 2, the process at least includes the following steps S210 to S220. At step S210, a floating window is created.

Herein, if the floating window is not created, the second display interface that is displayed on the virtual display screen may not be viewed by the user. Based on this, in order to make the user to view the second display interface that is displayed on the virtual display screen, it is necessary to create the floating window.

The floating window refers to a window that is displayed in the first terminal, and the floating window is a carrier of the virtual display screen, that is, the virtual display screen is displayed in the first terminal based on the floating window.

For example, if the system of the first terminal is the Android system, the floating window may be created through a window management service in the Android system.

At step S220, the second display interface that is displayed on the virtual display screen is displayed on the floating window by using the floating window as a carrier.

Herein, the first display interface is actually composed of multiple views, and the floating window may be a floating view corresponding to the first display interface. After creating the virtual display screen, the first processor may assign to the virtual display screen a corresponding screen identification and a storage identification corresponding to the screen identification. There is a stack corresponding to the virtual display screen, there is a storage area corresponding to the storage identification in the stack, and the storage area stores screen data. By sending the screen data stored in the storage area to the floating window, the user can be made to see the content displayed on the virtual display screen on the floating window.

Specifically, by using the floating window as the carrier, the process of creating the floating window is as follows: synthesizing the view corresponding to the second display interface by using the surfaceflinger, obtaining a result of the synthesizing; and sending the result of the synthesizing to a target stack (the target stack corresponds to the virtual display screen), at which time the display data corresponding to the virtual display screen is stored in a first storage area corresponding to a first storage identification in the target stack.

There is a floating view (i.e., a floating window) corresponding to the first display interface, and an updated floating view is obtained by placing on the floating view the result of the synthesizing (the result obtained by synthesizing the view corresponding to the second display interface by using the surfaceflinger). Based on this, another result of the synthesizing is obtained by synthesizing the updated floating view and other views (corresponding to the first display interface, excluding the floating view) based on the surfaceflinger, and the another result of the synthesizing is sent to the target stack and stored in a second storage area corresponding to a second storage identification in the target stack. Based on this, the user can see the first display interface displayed on the first display screen, and the user can also see the second display interface displayed on the virtual display screen.

By way of example, the virtual display screen is placed on the floating window, causing that the floating window acts as the carrier, in the first terminal, of the virtual display screen.

In this exemplary embodiment, the virtual display screen is displayed on the floating window by using the floating window as the carrier, causing that operations such as hiding/displaying, moving, and the like for the virtual display screen can be realized by adjusting the floating window subsequently.

Figure 3:
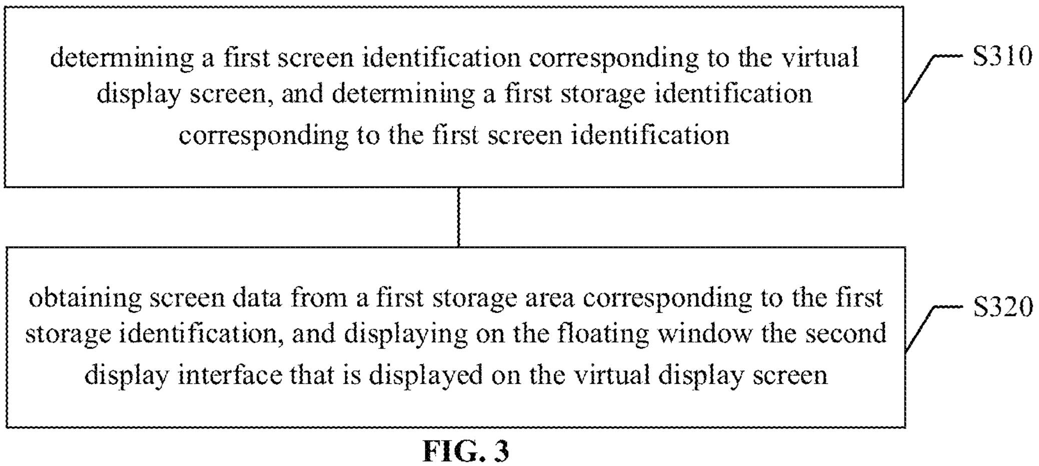
FIG. 3 schematically illustrates a flow diagram of a process after a virtual display screen is created in a first terminal configured for screen projection in an embodiment of the present disclosure.

In an optional embodiment, FIG. 3 illustrates a flow diagram of displaying on a floating window a second display interface that is displayed on a virtual display screen in a first terminal configured for screen projection. As shown in FIG. 3, the process at least includes the following steps S310 to S320. At step S310, a first screen identification corresponding to the virtual display screen is determined, and a first storage identification corresponding to the first screen identification is determined.

Herein, the first screen identification refers to an identification assigned to the virtual display screen by the first processor, and it is worth stating that the first processor also assigns a screen identification to the first display screen, and that the screen identification corresponding to the first display screen is distinguished from the first screen identification corresponding to the virtual display screen.

The first storage identification refers to an identification for storing screen data, and the first storage identification corresponds to the first screen identification. Specifically, a display screen corresponds to a stack, for example, there exists a stack corresponding to the first display screen, and there exists a stack corresponding to the virtual display screen. There exist different storage areas in each stack, and different data is stored in the different storage areas. What kind of display interface is displayed on the virtual display screen depends on what kind of screen data is stored in the first storage area in the stack corresponding to the first screen identification, herein, the first storage area corresponds to the first storage identification, and the first storage identification corresponds to the screen identification assigned to the virtual display screen.

For example, the first screen identification corresponding to the virtual display screen is determined to be Display 2, and the first storage identification corresponding to Display 2 is determined to be 3.

At step S320, screen data is obtained from the first storage area corresponding to the first storage identification, and the second display interface that is displayed on the virtual display screen is displayed on the floating window.

Herein, the first storage area is an area corresponding to the first storage identification.

By way of example, the screen data is obtained from the surface (an object storing the screen data) based on the storage identification 3, the screen data corresponds to the second display interface, and based on this, the second display interface may be displayed on the virtual display screen.

In this exemplary embodiment, the screen data is obtained from the first storage area corresponding to the first storage identification, and the virtual display screen is displayed on the floating window based on the screen data. Since the screen data corresponding to a plurality of storage identifications may be stored in the storage area, the screen data corresponding to the first storage identification may be precisely obtained from the storage area based on the first storage identification, and thus, the second display interface that is displayed on the virtual display screen is displayed on the virtual display screen.

In an optional embodiment, after creating the virtual display screen, the first processor is configured for assigning a first screen identification to the virtual display screen, where the first screen identification is different from a second screen identification, and the second screen identification is a screen identification assigned to the first display screen by the first processor.

Herein, the first screen identification refers to an identification used for distinguishing the first display screen from the virtual display screen, specifically, the first screen identification may be a number, a string, or a letter, and this exemplary embodiment does not make any special limitations on this.

The reason why it is necessary to assign the first screen identification to the virtual display screen is that when the virtual display screen is created, two display screens (i.e., the first display screen and the virtual display screen) exist in the first terminal, and in order to differentiate between the first display screen and the virtual display screen, the first screen identification will be assigned to the virtual display screen and the second screen identification will be assigned to the first display screen.

For example, after the first processor creates the virtual display screen, a first screen identification 1 may be assigned to the virtual display screen in order to distinguish the first screen identification 1 from a second screen identification 2 that is assigned to the first display screen.

In this exemplary embodiment, the first screen identification is assigned to the virtual display screen, and the first screen identification is different from the second screen identification. This lays a foundation for subsequently distinguishing the virtual display screen from the first display screen, and facilitates subsequent control of the virtual display screen by the second terminal.

Figure 4:
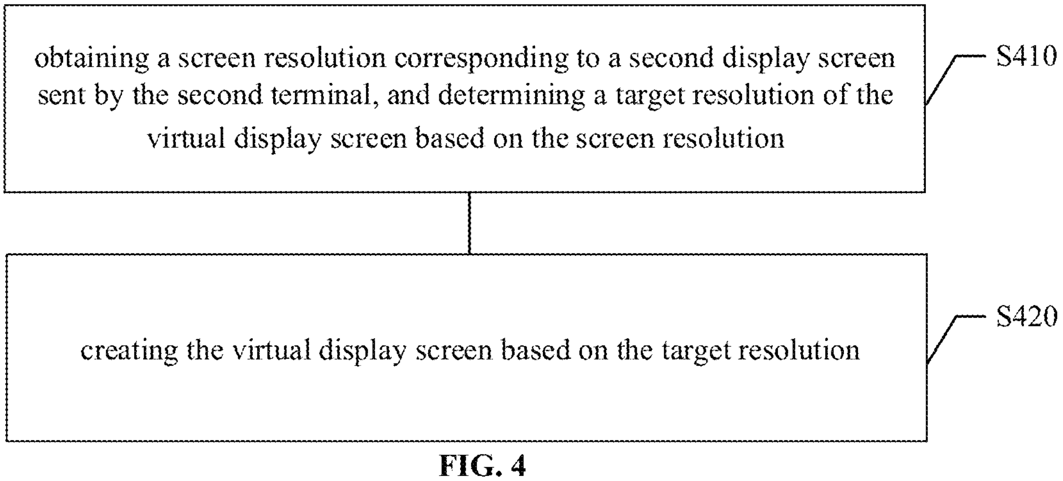
FIG. 4 schematically illustrates a flow diagram of creating a floating window in a first terminal configured for screen projection of an embodiment of the present disclosure.

In an optional embodiment, FIG. 4 illustrates a flow diagram of creating a floating window in a first terminal configured for screen projection. As shown in FIG. 4, the process at least includes the following steps S410 to S420. At step S410, a screen resolution corresponding to the second display screen sent by the second terminal is obtained, and a target resolution of the virtual display screen is determined based on the screen resolution.

Herein, the screen resolution of the second display screen refers to how many pixels the screen of the second display screen can display, and the target resolution refers to how many pixels the virtual display screen can display.

Generally, since the second terminal is a mobile terminal and the first terminal is a large-size terminal, the target resolution may be consistent with the screen resolution of the mobile terminal. Specifically, if the second terminal is a cell phone terminal, the target resolution may be made consistent with the screen resolution of the cell phone terminal; and if the second terminal is a tablet terminal, the target resolution may be made consistent with the screen resolution of the tablet terminal.

For example, the screen resolution of the second display screen sent by the second terminal is 1920×1080, based on which the target resolution may be consistent with the screen resolution, i.e., the target resolution is also 1920×1080.

At step S420, the virtual display screen is created based on the target resolution.

Herein, the virtual display screen is created based on the target resolution.

By way of example, the virtual display screen is created, and the resolution of the virtual display screen is the target resolution 1920×1080.

In this exemplary embodiment, the virtual display screen is created based on the target resolution, and the target resolution corresponds to the screen resolution, so that the resolution of the virtual display screen displayed in the first terminal is adapted to the resolution of the second display screen of the second terminal, which optimizes the degree of the user's experience of subsequent control.

In step S130, the second display interface is created, and the virtual display screen is controlled to display the second display interface.

In this exemplary embodiment, the second display interface is distinguished from the first display interface. On the one hand, if the first display interface is a management interface of the application A, the second display interface may be a file interface of the same application (i.e., the application A), a setting interface of the application A, or any interface of the application A that is distinguished from the first display interface, and this exemplary embodiment does not make any special limitations on this; on another hand, if the first display interface is the management interface of the application A, the second display interface may also be a management interface of the application B (i.e., not application A), or may be any other interface of the application B, and this exemplary embodiment does not make any special limitations on this; on yet another hand, the first display interface and the second display interface may be any two interfaces that are differentiated, and are not limited to being related to certain applications.

It is worth stating that by storing the screen data corresponding to the second display interface in the storage area, the virtual display screen may be controlled to display the second display interface. Herein, the storage identification of the storage area corresponds to the screen identification of the virtual display screen. Moreover, at this time, the display process of displaying the second display interface on the virtual display screen is not a real displaying, and thus, the user is unable to see the second display interface in the first terminal.

By way of example, the second display interface corresponding to the application B is created, and the second display interface is displayed on the virtual display screen.

Figure 5:
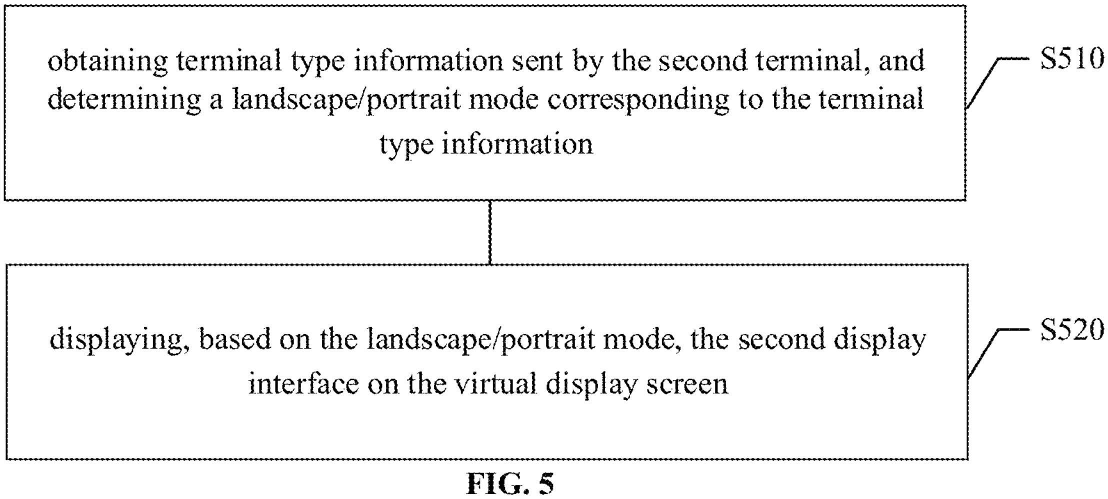
FIG. 5 schematically illustrates a flow diagram of controlling a virtual display screen to display a second display interface in a first terminal configured for screen projection in an embodiment of the present disclosure.

In an optional embodiment, FIG. 5 illustrates a flow diagram of controlling a virtual display screen to display a second display interface in a first terminal configured for screen projection. As shown in FIG. 5, the process at least includes the following steps S510 to S520. At step S510, terminal type information sent by the second terminal is obtained, and a landscape/portrait mode corresponding to the terminal type information is determined.

Herein, the terminal type information refers to information describing a terminal type. Specifically, since the second terminal is a mobile terminal, the terminal type information may be a cell phone, or a tablet, and this exemplary embodiment does not make any special limitations on this.

The landscape/portrait mode refers to a mode for displaying the second display interface. Specifically, the landscape/portrait mode may be a landscape mode, or a portrait mode, and this exemplary embodiment does not make any special limitations on this.

For example, if the terminal type information sent by the second terminal is obtained as a tablet, the landscape/portrait mode corresponding to the tablet is determined as a landscape mode; and if the terminal type information sent by the second terminal is obtained as a cell phone, the landscape/portrait mode corresponding to the cell phone is determined as a portrait mode.

At step S520, the second display interface is displayed on the virtual display screen based on the landscape/portrait mode.

Herein, the second display interface is displayed on the virtual display screen based on the landscape/portrait mode.

For example, if the landscape/portrait mode is a landscape mode, the second display interface is displayed on the virtual display screen in a landscape manner.

In this exemplary embodiment, the second display interface is displayed on the virtual display screen based on the landscape/portrait mode, and the landscape/portrait mode corresponds to the terminal type information, ensuring that the landscape/portrait mode in which the first terminal displays the second display interface is consistent with the landscape/portrait mode in which the second terminal displays the second display interface subsequently, which improves the viewing experience of the user.

In step S140, the second display interface corresponding to the virtual display screen is projected to the second terminal, thereby causing the second terminal to display the second display interface.

Herein, the second display interface displayed on the virtual display screen is projected to the second terminal, causing that the second terminal also displays the second display interface.

By way of example, the management interface that is corresponding to the application B and displayed on the virtual display screen is projected to the second terminal, causing that the management interface corresponding to the application B is displayed in the second terminal.

Figure 6:
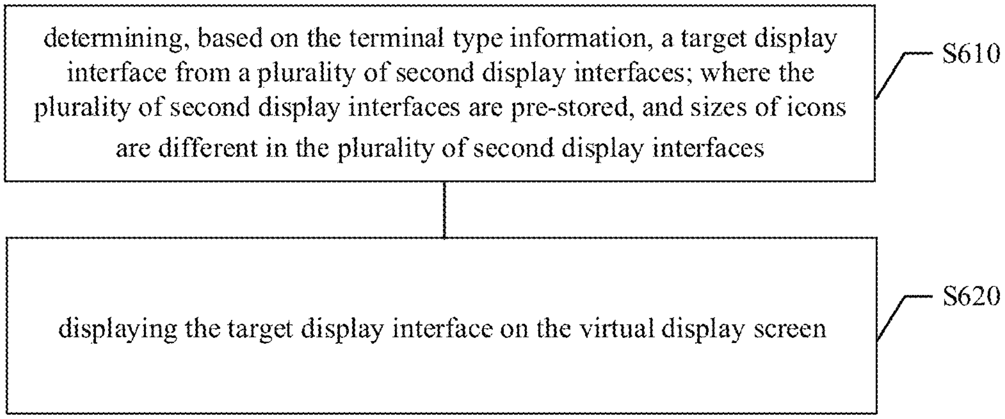
FIG. 6 schematically illustrates a flow diagram of displaying a target display interface on a virtual display screen in a first terminal configured for screen projection in an embodiment of the present disclosure.

In an optional embodiment, FIG. 6 illustrates a flow diagram of displaying a target display interface on a virtual display screen in a method of a first terminal configured for screen projection. As shown in FIG. 6, the method at least includes the following steps S610 to S620. At step S610, a target display interface is determined from a plurality of second display interfaces based on the terminal type information, where the plurality of second display interfaces are pre-stored, and sizes of icons are different in the plurality of second display interfaces.

The size of the icon refers to a size of an icon displayed on the second display interface. It is worth stating that, since the terminal types of the second terminal are various and of different sizes, an art designer usually designs interface diagrams adapted to different terminal types of the second terminal for the same display interface. These interface diagrams adapted to the second terminals of different terminal types are the plurality of second display interfaces. In addition, the plurality of second display interfaces with different sizes of icons are usually pre-stored.

For example, two second display interfaces corresponding to the management interface are determined. Specifically, the two second display interfaces are an interface X-1 and an interface X-2, where the interface X-1 is adapted to a mobile terminal, and the interface X-2 is adapted to a tablet terminal.

The target display interface is one of the plurality of second display interfaces, and the target display interface is determined based on the terminal type information, i.e., the target display interface is the one of the plurality of second display interfaces that is adapted to the terminal type information.

For example, since the terminal type information is a tablet, the target display interface is the interface X-2.

At step S620, the target display interface is displayed on the virtual display screen.

Herein, after the target display interface is determined, the target display interface is displayed on the virtual display screen.

By way of example, the interface X-2 is displayed on the virtual display screen.

In this exemplary embodiment, the target display interface is displayed on the virtual display screen, and since the target display interface is determined from all the second display interfaces based on the terminal type information, the degree of adaptation of the icons on the target display interface to the terminal type information of the second terminal is improved, and the degree of viewing experience of the user is optimized.

Figure 7:
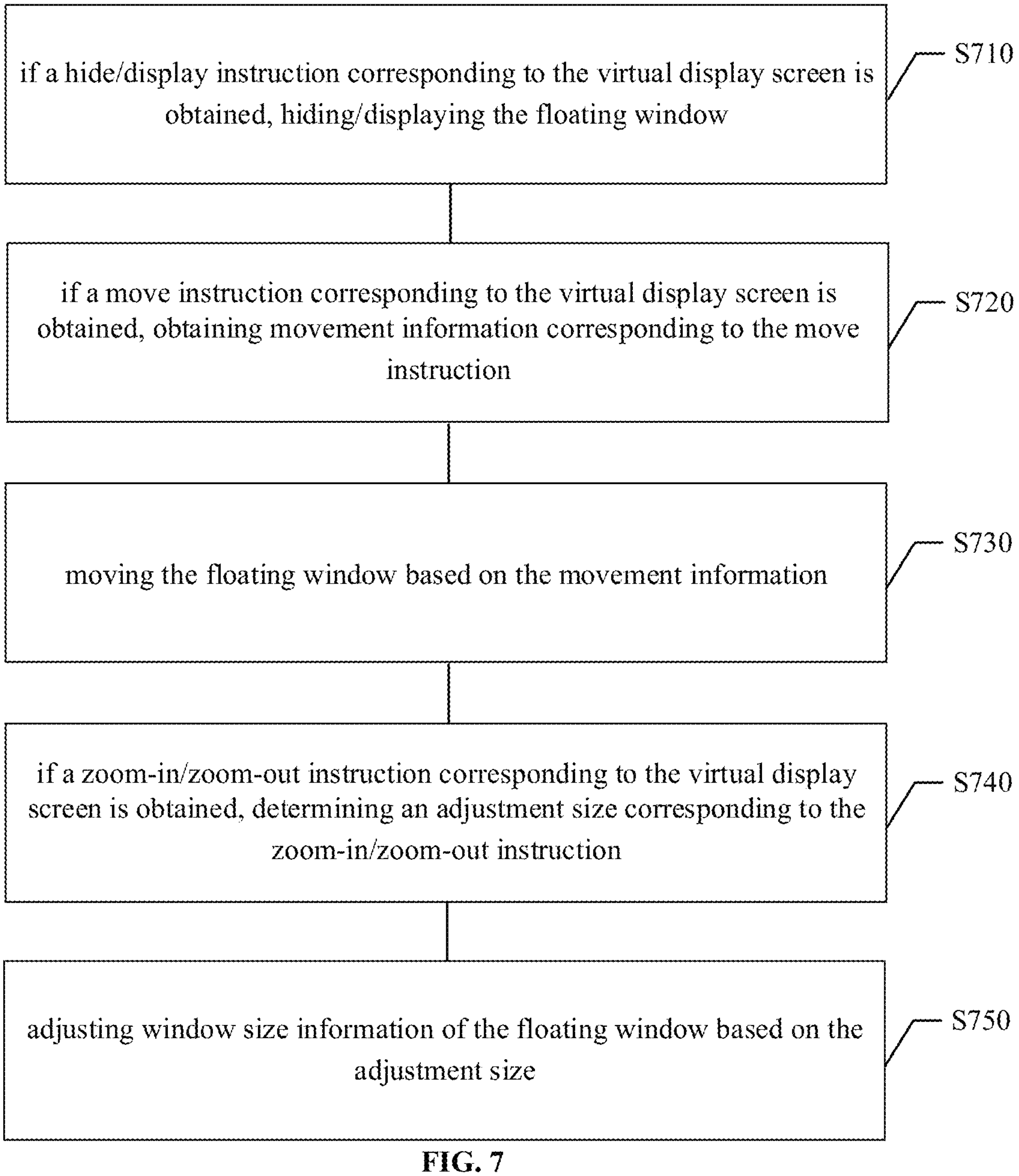
FIG. 7 schematically illustrates a flow diagram of a process after a second terminal is controlled to display a second display interface in a first terminal configured for screen projection in an embodiment of the present disclosure.

In an optional embodiment, FIG. 7 illustrates a flow diagram of a process after a second terminal is controlled to display a second display interface in a first terminal configured for screen projection. As shown in FIG. 7, the process at least includes the following steps S710 to S750. At step S710, the floating window is hidden/displayed if a hide/display instruction corresponding to the virtual display screen is obtained.

Herein, the hide/display instruction includes an instruction for hiding the virtual display screen or an instruction for displaying the virtual display screen. It is worth stating that the hide/display instruction may be sent by the second terminal to the first terminal, or may be obtained by the first processor in the first terminal after the user acts a certain operation on the first display screen, and this exemplary embodiment does not make any special limitations on this.

If a hide instruction corresponding to the virtual display screen is obtained, the floating window is hidden, and the virtual display screen is thereby hidden, at which time the user cannot see in the first terminal the second display interface. If a display instruction corresponding to the virtual display screen is obtained, the floating window is displayed, and the virtual display screen is thereby displayed, at which time the user can see in the first terminal the second display interface.

For example, if the display instruction corresponding to the virtual display screen is obtained, the floating window is displayed, at which time the user can see in the first terminal the second display interface displayed on the floating window.

At step S720, if a move instruction corresponding to the virtual display screen is obtained, movement information corresponding to the move instruction is obtained.

Herein, only the move instruction may be obtained, or the move instruction may be obtained at the same time in addition to the display/hide instruction.

The move instruction refers to an instruction for moving a display position of the floating window in the first terminal. Specifically, the move instruction may be sent by the second terminal to the first terminal, or may be a touch control operation acted by the user on the floating window, and the touch control operation may be an operation for dragging and dropping the floating window.

The movement information may be a movement direction and a movement distance carried in the move instruction, or the movement information may be all information corresponding to the move instruction, and this exemplary embodiment does not make any special limitations on this.

For example, if the move instruction corresponding to the virtual display screen sent by the second terminal is received, the movement direction corresponding to the move instruction is obtained, and the movement distance corresponding to the move instruction is obtained.

At step S730, the floating window is moved based on the movement information.

Herein, the floating window is moved based on the movement information, thereby realizing the movement of the virtual display screen.

For example, if the movement information obtained corresponding to the move instruction includes a movement distance of 5 pixels and a movement direction of upward, the floating window is moved upward by 5 pixels.

At step S740, if a zoom-in/zoom-out instruction corresponding to the virtual display screen is obtained, an adjustment size corresponding to the zoom-in/zoom-out instruction is determined.

Herein, only the zoom-in/zoom-out instruction may be obtained, or the zoom-in/zoom-out instruction may be obtained at the same time in addition to the display/hide instruction and the move instruction.

The zoom in/zoom-out instruction may be an instruction for zooming in on the virtual display screen or an instruction for zooming out on the virtual display screen. If the zoom-in/zoom-out instruction is an instruction for zooming in on the virtual display screen, the adjustment size refers to a size at which the floating window needs to be enlarged, and correspondingly, if the zoom-in/zoom-out instruction is an instruction for zooming out on the virtual display screen, the adjustment size refers to a size at which the floating window needs to be reduced.

By way of example, if the zoom-in/zoom-out instruction is an instruction for zooming in on the virtual display screen, the adjustment size refers to a size z at which the floating window needs to be enlarged.

At step S750, window size information of the floating window is adjusted based on the adjustment size.

Herein, the window size information of the floating window is adjusted based on the adjustment size, thereby realizing the zooming in or zooming out of the virtual display screen. It is worth stating that the size information of the floating window refers to an absolute size of the floating window.

By way of example, if the adjustment size refers to a size z at which the floating window needs to be enlarged, the window size information of the floating window is enlarged by z, thereby zooming in the virtual display screen.

In this exemplary embodiment, if the hide/display instruction corresponding to the virtual display screen is obtained, the floating window is hidden/displayed; if the move instruction corresponding to the virtual display screen is obtained, the floating window is moved based on the movement information corresponding to the move instruction; if the zoom-in/zoom-out instruction corresponding to the virtual display screen is obtained, the window size information of the floating window is adjusted, so that the user can control the virtual display screen based on different scenarios.

Figure 8:
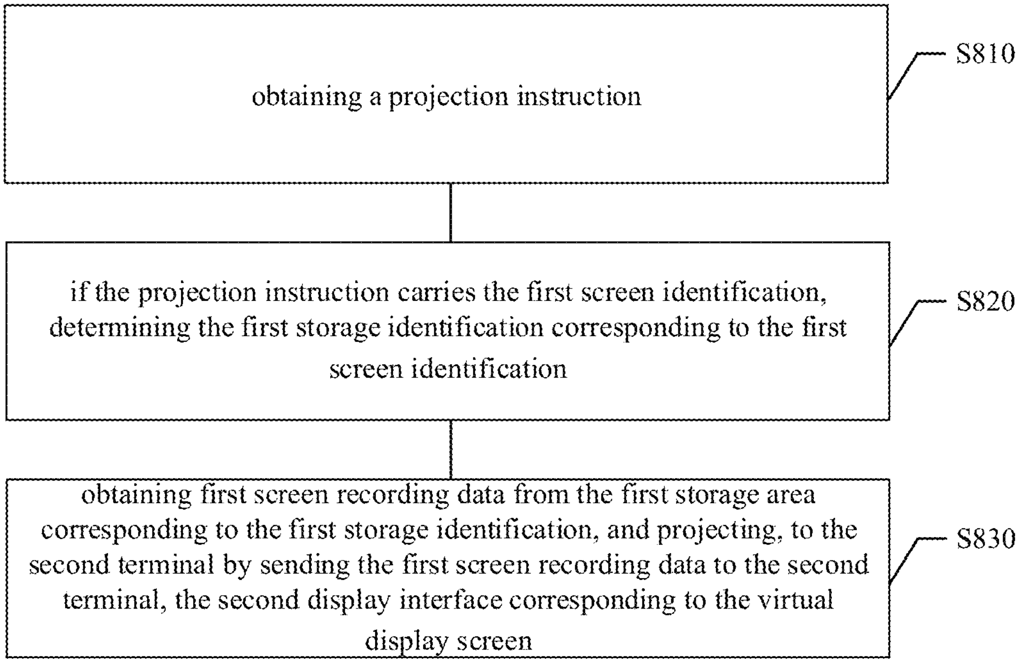
FIG. 8 schematically illustrates a flow diagram of projecting to a second terminal a second display interface corresponding to a virtual display screen in a first terminal configured for screen projection in an embodiment of the present disclosure.

In an optional embodiment, FIG. 8 illustrates a flow diagram of projecting to a second terminal a second display interface corresponding to a virtual display screen in a first terminal configured for screen projection. As shown in FIG. 8, the process at least includes the following steps S810 to S830. At step S810, a projection instruction is obtained.

Herein, the projection instruction refers to an instruction for projecting the second display interface to the second terminal. Specifically, the projection instruction may be sent by the second terminal to the first terminal, or may be an instruction generated when the user acts a certain operation in the first terminal, and this exemplary embodiment does not make any special limitations on this.

For example, the projection instruction sent by the second terminal is obtained.

At step S820, if the projection instruction carries the first screen identification, the first storage identification corresponding to the first screen identification is determined.

Herein, if the projection instruction carries the first screen identification, the first storage identification corresponding to the first screen identification may be determined based on the first screen identification.

For example, if the projection instruction carries a first screen identification 1, then a first storage identification 01 corresponding to the first screen identification 1 may be obtained.

At step S830, first screen recording data is obtained from the first storage area corresponding to the first storage identification, and the second display interface corresponding to the virtual display screen is projected to the second terminal by sending the first screen recording data to the second terminal.

Herein, the first screen recording data refers to the screen data on the virtual display screen corresponding to the first screen identification. After the first screen recording data is sent to the second terminal, the process of projecting to the second terminal the second display interface corresponding to the virtual display screen is achieved.

By way of example, the first storage area corresponding to the first storage identification 01 is determined, and the first screen recording data stored in the first storage area is sent to the second terminal, thereby realizing the process of projecting the second display screen to the second terminal.

In this exemplary embodiment, sending corresponding first screen recording data to the second terminal based on the first screen identification carried in the projection instruction realizes that the second display interface is projected to the second terminal, which is helpful for subsequent control of the virtual display screen through the second terminal, and avoids the situation of the prior art in which the content displayed on the virtual display screen needs to be interrupted when the content displayed on the virtual display screen is changed, optimizing the user's experience.

Figure 9:
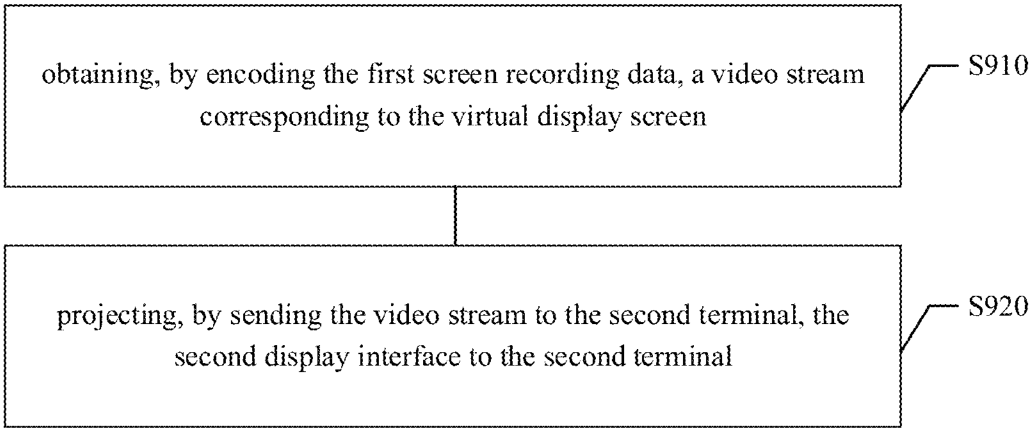
FIG. 9 schematically illustrates a flow diagram of projecting to a second terminal a second display interface corresponding to a virtual display screen in a first terminal configured for screen projection in an embodiment of the present disclosure.

In an optional embodiment, FIG. 9 illustrates a flow diagram of projecting to a second terminal a second display interface corresponding to a virtual display screen in a first terminal configured for screen projection. As shown in FIG. 9, the process at least includes the following steps S910 to S920. At step S910, a video stream corresponding to the virtual display screen is obtained by encoding the first screen recording data.

Herein, the first screen recording data corresponding to the first display screen and the screen recording data corresponding to the virtual display screen may generally be stored in the same object. By storing the identification, it is possible to obtain only the first screen recording data corresponding to the virtual display screen.

Figure 10:
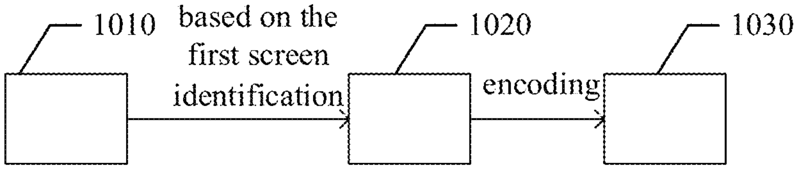
FIG. 10 schematically illustrates a flow diagram of processing first screen recording data in a first terminal configured for screen projection in an embodiment of the present disclosure.

By way of example, FIG. 10 schematically illustrates a flow diagram of processing first screen recording data. As shown in FIG. 10, the object 1010 is an object in which the screen recording data is stored, and the screen recording data includes the first screen recording data 1020 corresponding to the virtual display screen and the screen recording data corresponding to the first display screen. The first screen recording data 1020 corresponding to the virtual display screen may be obtained from the object 1010 based on the first screen identification.

After the first screen recording data 1020 corresponding to the virtual display screen is obtained, the video stream 1030 may be obtained by encoding the first screen recording data, and the video stream 1030 corresponds to the virtual display screen.

By way of example, as shown in the drawing, the video stream 1030 may be obtained by encoding the first screen recording data, and the video stream 1030 corresponds to the virtual display screen.

At step S920, the second display interface is projected to the second terminal by sending the video stream to the second terminal.

Herein, sending to the second terminal the video stream corresponding to the virtual display screen may realize projecting the second display interface to the second terminal. Specifically, the video stream may be sent to the second terminal via H264 (a standard format for the encoding layer of the video), or the video stream may be sent to the second terminal via other formats, which is not specifically limited by this exemplary embodiment.

For example, sending the video stream 1030 shown in FIG. 10 to the second terminal realizes the process of projecting the second display interface to the second terminal.

In this exemplary embodiment, projecting the second display interface to the second terminal by sending the video stream to the second terminal is helpful for subsequent control of the virtual display screen in the first terminal by using the second terminal.

Figure 11:
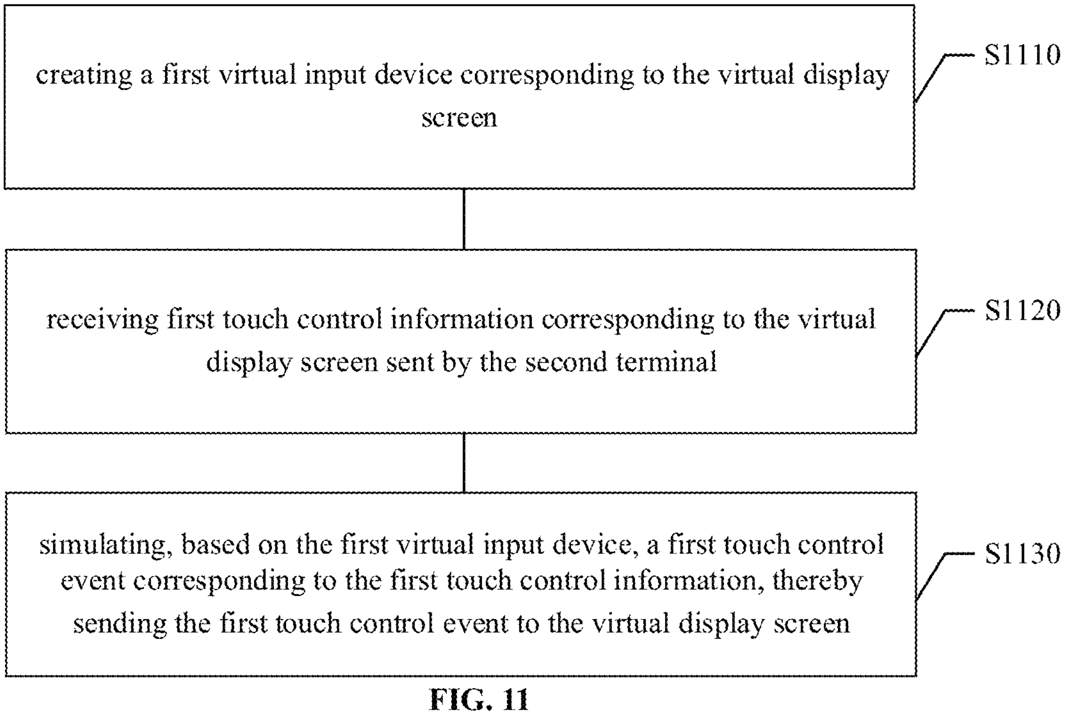
FIG. 11 schematically illustrates a flow diagram of a process in a first terminal configured for screen projection after a second display interface is displayed by a second terminal in an embodiment of the present disclosure.

In an optional embodiment, FIG. 11 illustrates a flow diagram of a process in a first terminal configured for screen projection after a second display interface is displayed by a second terminal. As shown in FIG. 11, the method at least includes the following steps S1110 to S1130. At step S1110, a first virtual input device corresponding to the virtual display screen is created.

Herein, since the virtual display screen is the second screen in the first terminal, even though the first screen identification has been assigned to the virtual display screen, the first processor may still send the received touch control information to the first display screen by default.

In order to be capable of sending the touch control information to the virtual display screen to realize control of the virtual display screen, it is necessary to create the first virtual input device corresponding to the virtual display screen.

By way of example, a first virtual input device X-2 corresponding to the virtual display screen is created.

At step S1120, first touch control information corresponding to the virtual display screen sent by the second terminal is received.

Herein, when the user controls the virtual display screen through the second terminal, a touch control operation may be acted on the second terminal, and the first touch control information is information corresponding to the touch control operation at this time. After obtaining the first touch control information, the second terminal may send the first touch control information to the first terminal.

For example, the first touch control information corresponding to the virtual display screen sent by the second terminal is received.

At step S1130, a first touch control event corresponding to the first touch control information is simulated based on the first virtual input device, thereby sending the first touch control event to the virtual display screen.

Herein, the first touch control event refers to an event simulated based on the touch control information to be corresponding to the touch control operation. It is worth stating that the first touch control event is simulated by the first virtual input device.

By way of example, the first touch control event corresponding to the first touch control information is simulated through the first virtual input device, and specifically, the simulated first touch control event is an input event. Based on this, the input event is sent to the virtual display screen.

At step S1140, the second display interface is controlled based on the first touch control event.

Herein, the second display interface is controlled based on the first touch control event.

At this time, when the first touch control information is obtained, the first touch control event corresponding to the first touch control information may be simulated based on the first virtual input device, so as to achieve control of the virtual display screen based on the first touch control event.

By way of example, the first touch control event is an input event, and thus corresponding content is input on the second display interface.

In this exemplary embodiment, on the one hand, the first virtual input device is created to avoid a situation in which the first touch control information only acts on the first display interface; on the other hand, the first touch control event corresponding to the first touch control information is simulated, and the second display interface is controlled based on the first touch control event, realizing the process of controlling the first terminal by using the second terminal.

Figure 12:
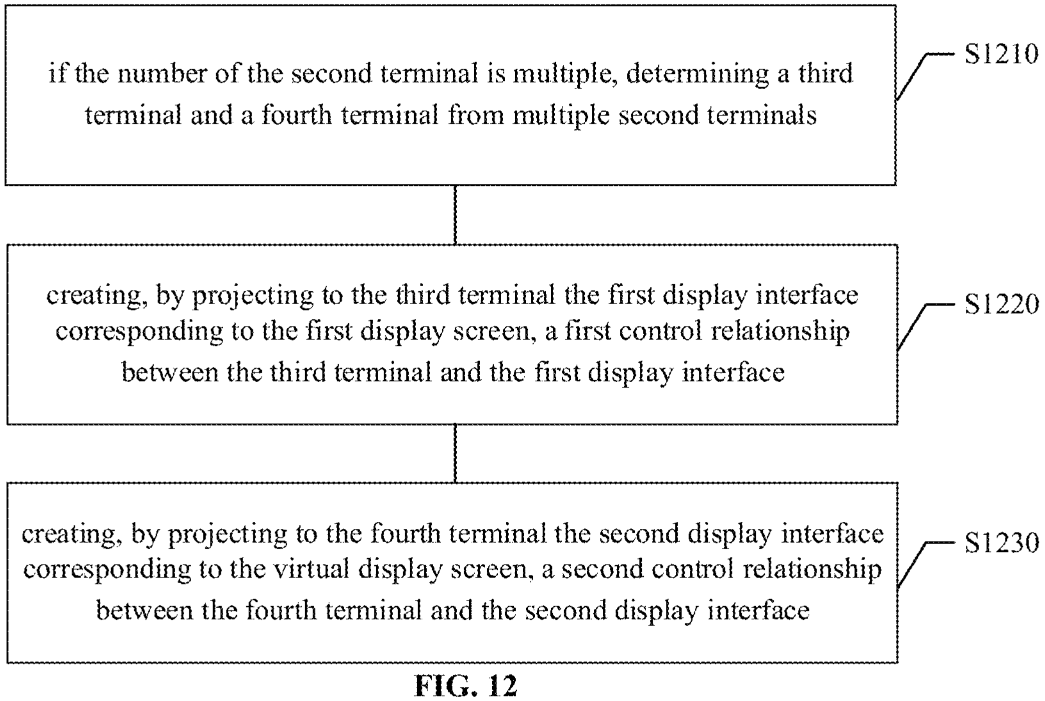
FIG. 12 schematically illustrates a flow diagram of creating a control relationship between a second terminal and a virtual display screen in a first terminal configured for screen projection in an embodiment of the present disclosure.

In an optional embodiment, FIG. 12 illustrates a flow diagram of creating a control relationship between a second terminal and a virtual display screen in a first terminal configured for screen projection, where the number of second terminals is multiple. As shown in FIG. 12, the process at least includes the following steps S1210 to S1230. At step S1210, if the number of the second terminals is multiple, a third terminal and a fourth terminal are determined from multiple second terminals.

Herein, if the number of the second terminals communicatively connected to the first terminal is multiple, two terminals may be determined from the multiple second terminals, and the two terminals are the third terminal and the fourth terminal, respectively.

The reason for determining the two terminals is to allow one of the terminals to control the first display interface and the other terminal to control the second display interface, thereby increasing the flexibility of controlling the first display screen and the virtual display screen.

For example, if the number of the second terminals that are communicatively connected to the first terminal is three, specifically, the three second terminals are a terminal X-4, a terminal X-5, and a terminal X-6, the terminal X-4 may be determined as the third terminal, and the terminal X-5 may be determined as the fourth terminal.

At step S1220, a first control relationship between the third terminal and the first display interface is created by projecting to the third terminal the first display interface corresponding to the first display screen.

Herein, after the third terminal and the fourth terminal are determined, in order to facilitate control of the first display interface by the third terminal, the first display interface may be projected to the third terminal to create the first control relationship between the third terminal and the first display interface, so as to ensure that the first display interface may be controlled by the third terminal subsequently.

For example, the first display interface is projected to the third terminal X-4, and thus, the first display interface may be controlled through the third terminal X-4.

At step S1230, a second control relationship between the fourth terminal and the second display interface is created by projecting to the fourth terminal the second display interface corresponding to the virtual display screen.

Herein, the second display interface is projected to the fourth terminal to create the second control relationship between the second display interface and the fourth terminal, so as to ensure that the second display interface may be controlled through the fourth terminal.

For example, the second display interface is projected to the fourth terminal X-5, and thus, the second control relationship between the fourth terminal X-5 and the second display interface is created, so that the fourth terminal X-5 may be used to control the second display interface subsequently.

In this exemplary embodiment, if the number of the second terminals is multiple, the third terminal and the fourth terminal are determined from the multiple second terminals, the first display interface is projected to the third terminal, and the second display interface is projected to the fourth terminal, which increases the flexibility of controlling the first display interface and the second display interface.

Figure 13:
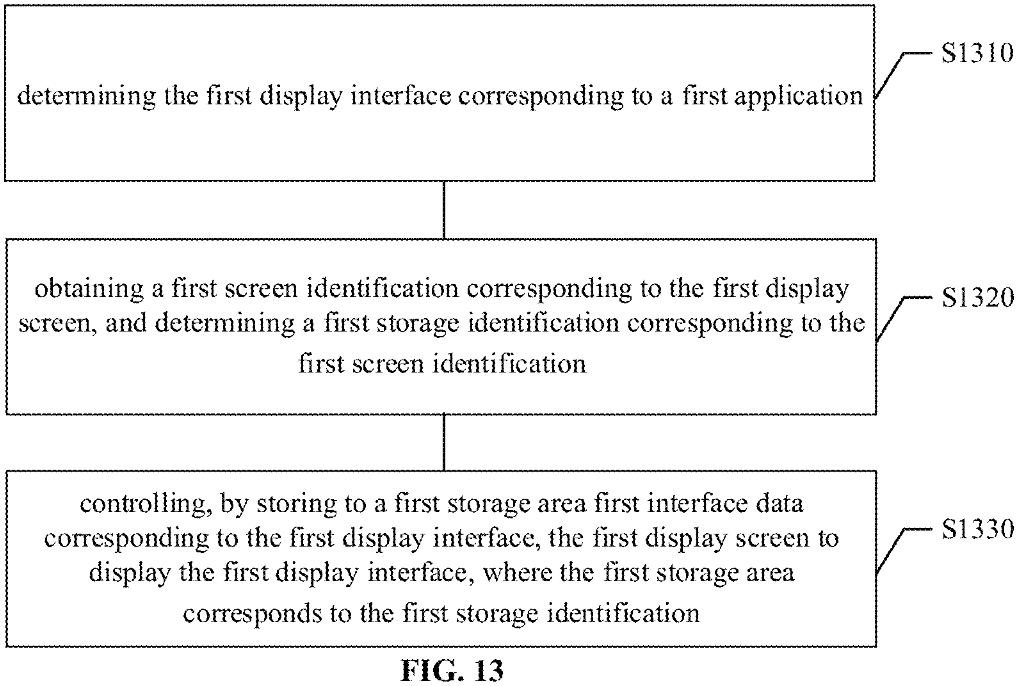
FIG. 13 schematically illustrates a flow diagram of controlling a first display screen to display a first display interface in a first terminal configured for screen projection in an embodiment of the present disclosure.

In an optional embodiment, FIG. 13 illustrates a flow diagram of controlling a first display screen to display a first display interface in a first terminal configured for screen projection. As shown in FIG. 13, the process at least includes the following steps S1310 to S1330. At step S1310, the first display interface corresponding to a first application is determined.

Herein, the first application may be an application obtained by the first terminal through local downloading. Specifically, the first application may be a video conference application, a communication application, or any kind of application that the user needs to use, and this exemplary embodiment does not make any special limitations on this.

The first display interface refers to an interface corresponding to the first application, for example, if the first application is a video conference application, the first display interface may be a main application interface corresponding to the first application, a management interface corresponding to the first application, or a conference interface corresponding to the first application, and this exemplary embodiment does not make any special limitations on this.

For example, the first application is a communication application, and the determined first display interface corresponding to the first application is an address book interface.

At step S1320, a first screen identification corresponding to the first display screen is obtained, and a first storage identification corresponding to the first screen identification is determined.

Herein, the first processor may assign a corresponding screen identification for each screen as created, i.e., the first processor may assign a screen identification for the first display screen, and the first processor may also assign a screen identification for the virtual display screen. The first screen identification refers to the screen identification assigned to the virtual display screen by the first processor.

The first storage identification refers to an identification corresponding to the first screen identification, and the first storage identification is used for distinguishing different storage areas in which different screen data may be stored. Different screen data corresponds to different display interfaces, based on which, in order to display different display interfaces on different display screens, screen data corresponding to different display interfaces may be stored in different storage areas.

By way of example, the obtained first screen identification corresponding to the first display screen is Display 1, and the determined first storage identification corresponding to the first screen identification is 01.

At step S1330, the first display screen is controlled, by storing to a first storage area first interface data corresponding to the first display interface, to display the first display interface, where the first storage area corresponds to the first storage identification.

Herein, the first storage area is a storage area corresponding to the first storage identification, and the first interface data is screen data corresponding to the first display interface, based on which, after the first interface data is stored to the first storage area, the first display interface may be displayed on the first display screen.

By way of example, the first data corresponding to the first display interface is stored in the first storage area, where the first storage area corresponds to the first storage identification 01. Based on this, the first display screen may be controlled to display the first display interface.

In this exemplary embodiment, storing the first interface data to the first storage area not only controls the first display screen to display the first display interface, but also lays, by storing the corresponding interface data in the corresponding storage area, a foundation for subsequently displaying different display interfaces on different display screens.

Figure 14:
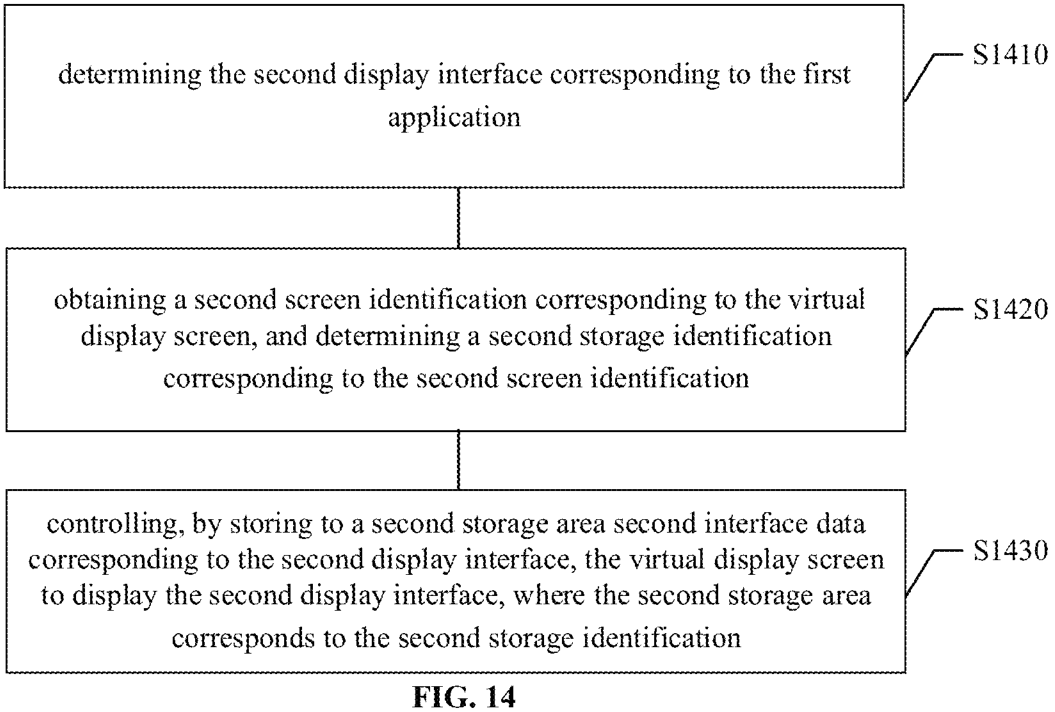
FIG. 14 schematically illustrates a flow diagram of controlling a virtual display screen to display a second display interface in a first terminal configured for screen projection in an embodiment of the present disclosure.

In an optional embodiment, FIG. 14 illustrates a flow diagram of controlling a virtual display screen to display a second display interface in a first terminal configured for screen projection. As shown in FIG. 14, the process at least includes the following steps S1410 to S1430. At step S1410, the second display interface corresponding to the first application is determined.

Herein, the second display interface is distinguished from the first display interface, and the second display interface also corresponds to the first application.

For example, since the first application is a communication application, and the determined first display interface corresponding to the first application is an address book interface, the second display interface may be a setting interface corresponding to the communication application.

At step S1420, a second screen identification corresponding to the virtual display screen is obtained, and a second storage identification corresponding to the second screen identification is determined.

Herein, the second screen identification is a screen identification corresponding to the virtual display screen, and likewise, there exists the second storage identification corresponding to the second screen identification and used for storing screen data of the interface displayed on the virtual display screen.

By way of example, the second screen identification corresponding to the virtual display screen is obtained as Display 2, and the determined second storage identification corresponding to the second screen identification is 02.

At step S1430, the virtual display screen is controlled, by storing to a second storage area second interface data corresponding to the second display interface, to display the second display interface, where the second storage area corresponds to the second storage identification.

Herein, the second interface data is screen data corresponding to the second display interface, the second storage area is a storage area corresponding to the second storage identification, and storing the second interface data to the second storage area may control the virtual display screen to display the second display interface.

For example, storing the second interface data to the second storage area realizes displaying the second display interface on the virtual display screen.

In this exemplary embodiment, storing to the second storage area the second storage data corresponding to the second display interface realizes displaying the second display interface on the virtual display screen, and since the second display interface corresponds to the first application, dual-screen heterodyne displaying is thereby realized, which enables the user to see in the first terminal two display interfaces belonging to the same application at the same time, optimizing the user's experience.

Figure 15:
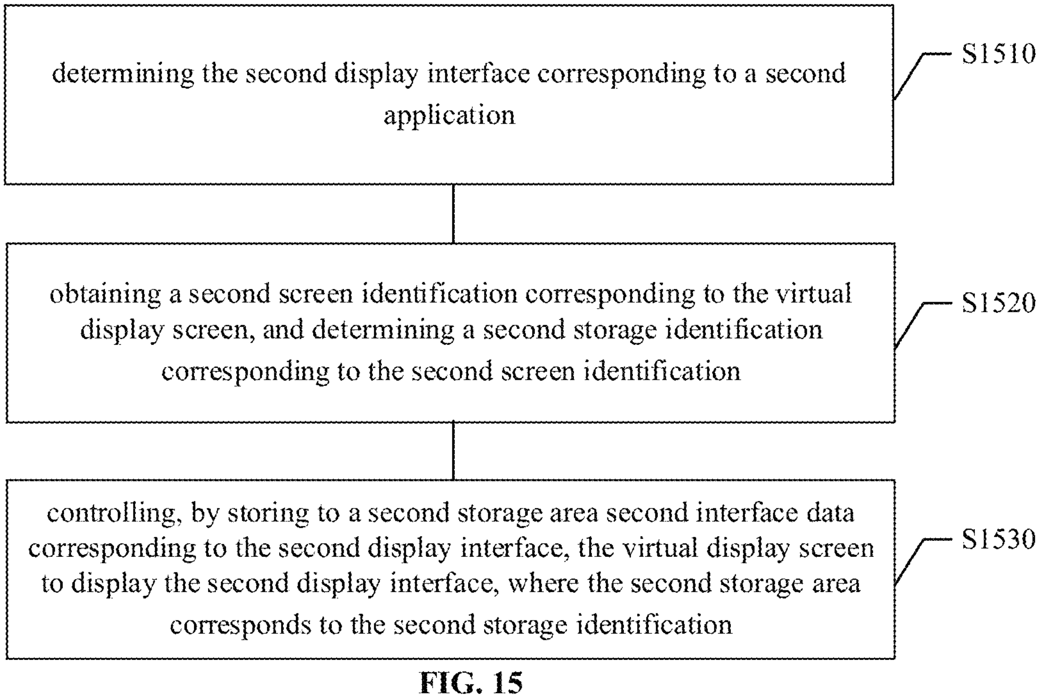
FIG. 15 schematically illustrates a flow diagram of controlling a virtual display screen to display a second display interface in a first terminal configured for screen projection in an embodiment of the present disclosure.

In an optional embodiment, FIG. 15 illustrates a flow diagram of controlling a virtual display screen to display a second display interface in a first terminal configured for screen projection. As shown in FIG. 15, the process at least includes the following steps S1510 to S1530. At step S1510, the second display interface corresponding to a second application is determined.

Herein, the second display interface may also be a display interface corresponding to the second application. The second application, as distinguished from the first application, may be any application in the first terminal other than the first application.

For example, since the first application is a video conference application, the second application may be a picture display application.

At step S1520, a second screen identification corresponding to the virtual display screen is obtained, and a second storage identification corresponding to the second screen identification is determined.

Herein, the second screen identification refers to an identification corresponding to the virtual display screen, and the second storage identification refers to an identification corresponding to the second screen identification and used for distinguishing a storage area.

For example, the second screen identification is Display 2, and the second storage identification corresponding to the second screen identification is 02.

At step S1530, the virtual display screen is controlled, by storing to a second storage area second interface data corresponding to the second display interface, to display the second display interface, where the second storage area corresponds to the second storage identification.

Herein, at this time, storing to the second storage area the second interface data corresponding to the second display interface may realize displaying the display interface corresponding to the second application on the virtual display screen.

For example, the second interface data is stored in the storage area corresponding to the second storage identification 02, with which the virtual display screen is controlled to display the second display interface.

In this exemplary embodiment, storing to the second storage area the second storage data corresponding to the second display interface realizes displaying the second display interface on the virtual display screen, and since the second display interface corresponds to the second application, the display interfaces of the dual applications are thereby displayed in the first terminal, which enables the user to see in the first terminal two display interfaces belonging to different applications at the same time, optimizing the user's experience.

Figure 16:
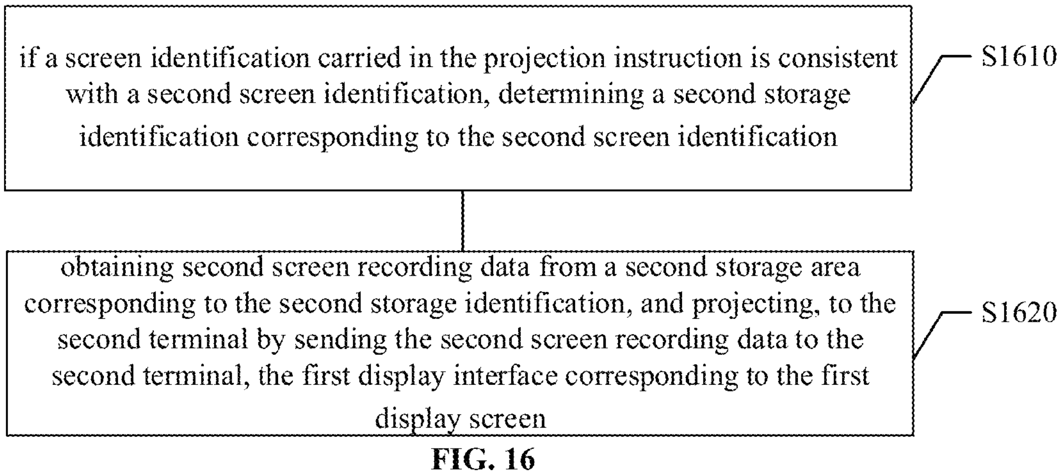
FIG. 16 schematically illustrates a flow diagram of projecting to a second terminal a first display interface corresponding to a first display screen in a second terminal configured for screen projection in an embodiment of the present disclosure.

In an optional embodiment, FIG. 16 illustrates a flow diagram of projecting to a second terminal a first display interface corresponding to a first display screen in a first terminal configured for screen projection. As shown in FIG. 16, the process at least includes the following steps S1610 to S1620. At step S1610, if a screen identification carried in the projection instruction is consistent with a second screen identification, a second storage identification corresponding to the second screen identification is determined.

Herein, if the screen identification carried in the projection instruction is consistent with the second screen identification, it means that the screen to be projected at this time is no longer the virtual display screen, but the first display screen.

Based on this, the second storage identification corresponding to the second screen identification is determined.

For example, if the screen identification carried in the projection instruction is consistent with the second screen identification 2, the second storage identification 02 corresponding to the second screen identification 2 is determined.

At step S1620, second screen recording data is obtained from a second storage area corresponding to the second storage identification, and the first display interface corresponding to the first display screen is projected to the second terminal by sending the second screen recording data to the second terminal.

Herein, the second storage area refers to an area in which the second screen recording data is stored in the storage area, and the second screen recording data is screen data corresponding to the first display screen. After the second screen recording data is obtained, the second screen recording data is sent to the second terminal, thereby realizing the projection process for the first display screen.

By way of example, the second screen recording data is obtained from the second storage area corresponding to the second storage identification 02, and the second screen recording data is sent to the second terminal, which realizes projecting the first display interface displayed on the first display screen to the second terminal.

In this exemplary embodiment, sending corresponding second screen recording data to the second terminal based on the second screen identification carried in the projection instruction realizes that the first display interface is projected to the second terminal, which is helpful for subsequent control of the first display screen through the second terminal, and avoids the situation of the prior art in which the content displayed on the first display screen needs to be interrupted when the content displayed on the first display screen is changed, optimizing the user's experience.

Figure 17:
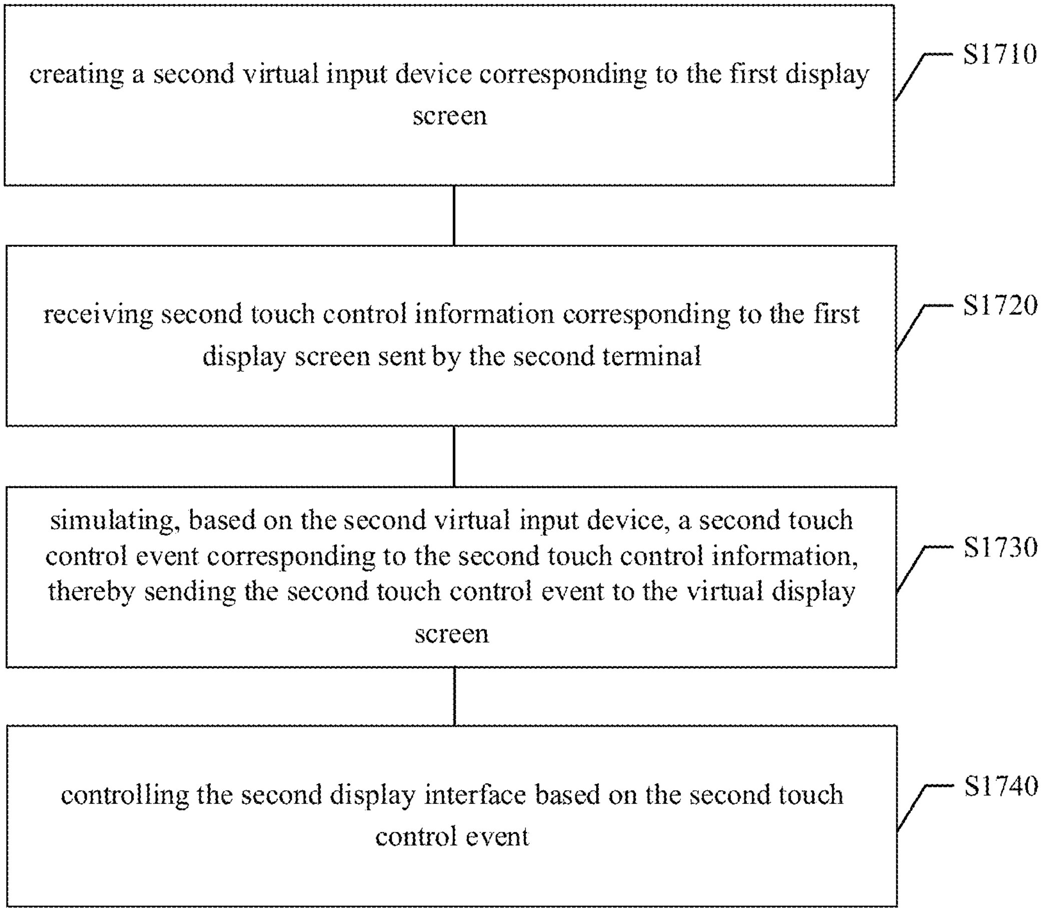
FIG. 17 schematically illustrates a flow diagram of controlling a second display interface based on a second touch control event in a second terminal configured for screen projection in an embodiment of the present disclosure.

In an optional embodiment, FIG. 17 illustrates a flow diagram of controlling a second display interface based on a second touch control event in a first terminal configured for screen projection. As shown in FIG. 17, the process at least includes the following steps S1710 to S1740. At step S1710, a second virtual input device corresponding to the first display screen is created.

Herein, the second virtual input device is a virtual input device created by the first processor and corresponding to the first display screen.

By way of example, a second virtual input device X-3 corresponding to the first display screen is created.

At step S1720, second touch control information corresponding to the first display screen sent by the second terminal is received.

Herein, when the user controls the first display screen through the second terminal, the user may act on the second terminal a touch control operation, and the second touch control information is information corresponding to the touch control operation at this time. After obtaining the second touch control information, the second terminal may send the second touch control information to the first terminal.

For example, the second touch control information corresponding to the first display screen sent by the second terminal is received.

At step S1730, a second touch control event corresponding to the second touch control information is simulated based on the second virtual input device, thereby sending the second touch control event to the virtual display screen.

Herein, the second touch control event refers to an event simulated based on the second touch control information to be corresponding to the touch control operation. It is worth stating that the second touch control event is simulated by the second virtual input device.

By way of example, the second touch control event corresponding to the second touch control information is simulated through the second virtual input device, and specifically, the simulated second touch control event is a click event. Based on this, the click event is sent to the virtual display screen.

At step S1740, the second display interface is controlled based on the second touch control event.

Herein, the second display interface may be controlled based on the second touch control event.

By way of example, when the second touch control information is obtained, the second touch control event corresponding to the second touch control information may be simulated based on the second virtual input device, so as to achieve control of the first display screen based on the second touch control event.

By way of example, the second touch control event is a click event, and the first display screen is thereby controlled to trigger the click event.

In this exemplary embodiment, on the one hand, the second virtual input device is created, the second touch control event is created through the second virtual input device, so as to control the second display interface based on the second touch control event, which realizes the process of controlling the first terminal by using the second terminal.

The present disclosure proposes a second terminal configured for screen projection. The second terminal includes a second processor and a second display screen. The second terminal is communicatively connected to a first terminal. The first terminal includes a first processor and a first display screen. The second processor is configured for: receiving a second display interface projected to the second terminal, and displaying the second display interface, where the second display interface is displayed on a virtual display screen, the virtual display screen is created by the first processor, and the first processor further generates a first display interface and controls the first display screen to display the first display interface.

Herein, the second terminal is a terminal communicatively connected to the first terminal. Generally, the second terminal is a mobile terminal. Specifically, the second terminal may be a cell phone terminal, a tablet terminal, or any kind of mobile terminal, and this exemplary embodiment does not make any special limitations on this.

The second terminal includes the second processor and the second display screen. The second processor receives the second display interface projected to the second terminal, and then displays the second display interface on the second display screen. It is worth stating that the second display interface is an interface displayed on the virtual display screen, and the virtual display screen is another display screen created by the first terminal on the basis of the first display screen.

By way of example, the second display interface projected to the second terminal is received, and specifically, the second display interface may be a management interface of an application B, and the management interface of the application B is then displayed on the second display screen, which is helpful for subsequent controlling of the second display interface in the first terminal through the second terminal.

In an optional embodiment, the second processor is configured for sending a screen creation instruction to the first terminal, thereby causing the first processor corresponding to the first terminal to create the virtual display screen.

Herein, the screen creation instruction may be sent by the second terminal to the first terminal, and the first processor may create the virtual display screen at the first terminal after the first terminal receives the screen creation instruction sent by the second terminal.

For example, when the user starts the second terminal, the second terminal may send the screen creation instruction to the first terminal. And, after the first terminal receives the screen creation instruction, the virtual display screen may be created in the first terminal.

In this exemplary embodiment, the screen creation instruction may also be sent by the second terminal to the first terminal, realizing the process of controlling the creation of the virtual display screen by the second terminal.

Figure 18:
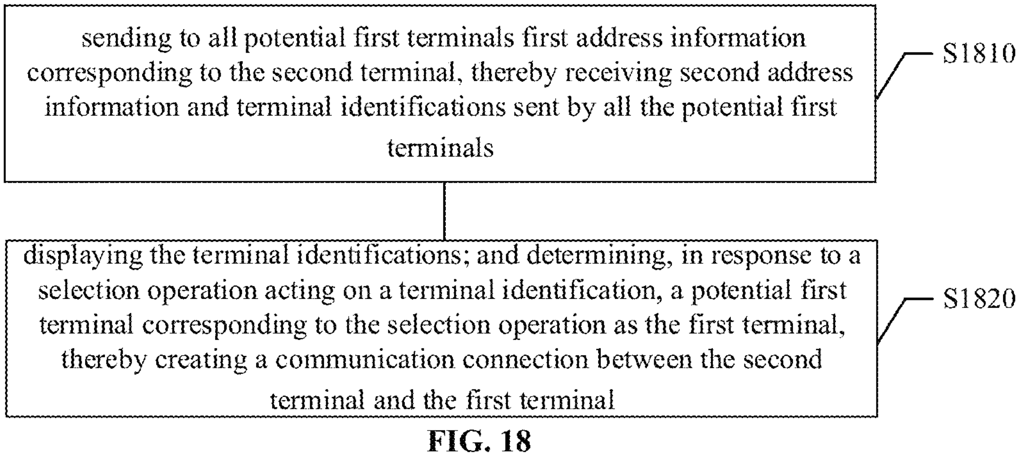
FIG. 18 schematically illustrates a flow diagram of determining a first terminal in a second terminal configured for screen projection in an embodiment of the present disclosure.

In an optional embodiment, FIG. 18 illustrates a flow diagram of determining a first terminal in a second terminal configured for screen projection. As shown in FIG. 18, the process at least includes the following steps S1810 to S1820. At step S1810, first address information corresponding to the second terminal is sent to all potential first terminals, and second address information and terminal identifications sent by all the potential first terminals are thereby received.

Herein, the first address information refers to address information corresponding to the second terminal. Specifically, the second address information may be an internet protocol address corresponding to the second terminal. The potential first terminal refers to a terminal that may establish a communication connection with the second terminal. Generally, the first address information may be broadcast and sent to all potential first terminals based on an internet data transfer protocol.

Specifically, the internet data transfer protocol may be a data transfer protocol (UDP-based data transfer protocol, or UDT for short) based on a user datagram protocol (UDP). The UDT may support massive data transfer over a high-speed wide area network, and a new congestion mechanism and data reliability control mechanism are introduced in the UDT. Therefore, using the UDT to transfer the first address information and the second address information can improve the transfer speed.

In addition to this, the internet data transfer protocol may be any other data transfer protocol, and this exemplary embodiment does not make any special limitations on this.

The second address information is address information corresponding to the potential first terminal. Specifically, the second address information may be an internet protocol address corresponding to the potential first terminal, or any kind of address information corresponding to the first terminal, and this exemplary embodiment does not make any special limitations on this. The terminal identification refers to an identification describing the terminal and corresponding to the potential first terminal. Specifically, the terminal identification may be a number, a letter, or a string, and this exemplary embodiment does not make any special limitations on this.

By way of example, the first address information of the second terminal is sent to the potential first terminal X-7, the potential first terminal X-8, and the potential first terminal X-9. Based on this, the second address information and the terminal identification 1 sent by the potential first terminal X-7 are received, the second address information and the terminal identification 2 sent by the potential first terminal X-8 are received, and the second address information and the terminal identification 3 sent by the potential first terminal X-9 are received.

At step S1820, the terminal identifications are displayed, a potential first terminal corresponding to a selection operation is determined as the first terminal in response to the selection operation acting on a terminal identification, thereby creating a communication connection between the second terminal and the first terminal.

Herein, the terminal identifications are displayed for selection by the user. When the user acts the selection operation on a terminal identification, the potential first terminal corresponding to the selection operation is determined as the first terminal, and thus, the communication connection between the first terminal and the second terminal is created.

Figure 19:
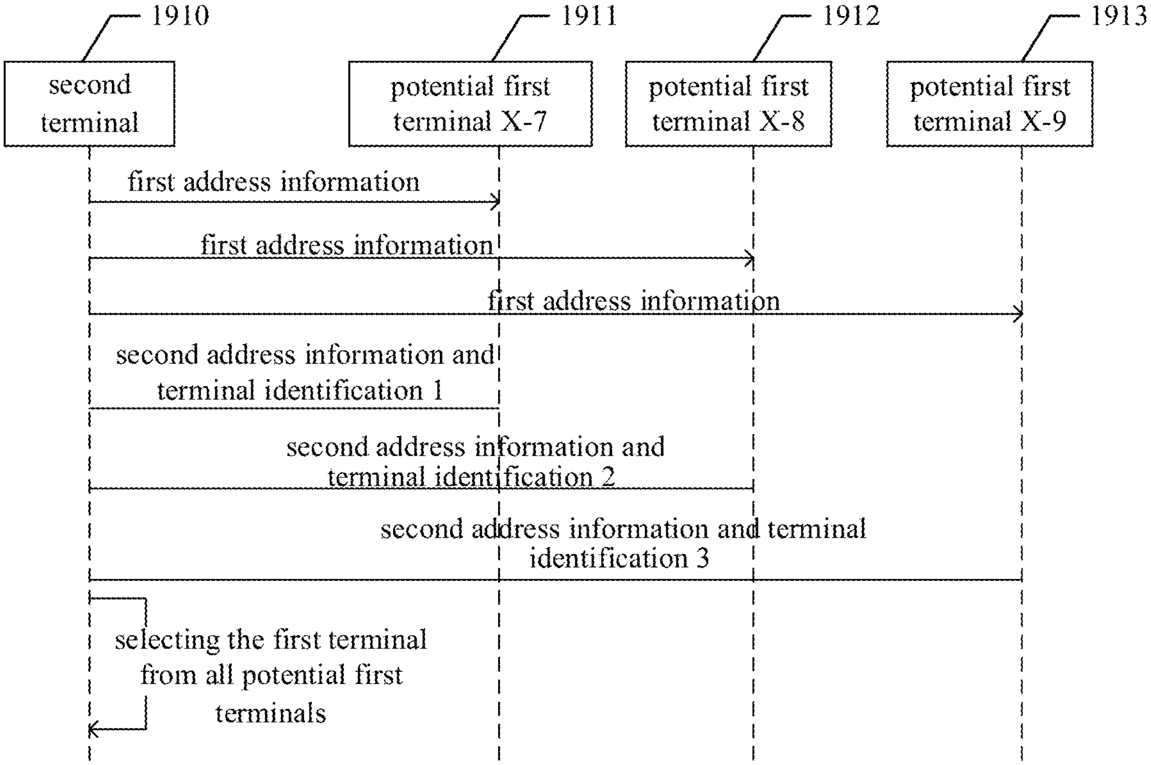
FIG. 19 schematically illustrates an interaction diagram of determining a first terminal from all potential first terminals in a second terminal configured for screen projection in an embodiment of the present disclosure.

By way of example, FIG. 19 schematically illustrates an interaction diagram of determining a first terminal from all potential first terminals. As shown in FIG. 19, the terminal 1910 is the second terminal, the terminal 1911 is the potential first terminal X-7, the terminal 1912 is the potential first terminal X-8, and the terminal 1913 is the potential first terminal X-9.

First, the terminal 1910 sends the first address information to the potential first terminal X-7, the potential first terminal X-8, and the potential first terminal X-9 through the internet data transfer protocol. Then, the potential first terminal X-7 sends the second address information and the terminal identification 1 to the second terminal 1910, the potential first terminal X-8 sends the second address information and the terminal identification 2 to the second terminal 1910, and the potential first terminal X-9 sends the second address information and the terminal identification 3 to the second terminal 1910. Finally, the user selects the first terminal from all potential first terminals. Specifically, the user performs the selection on the displayed terminal identifications, and specifically, the user acts the selection operation on the terminal identification 3, then the terminal 1913 is determined as the first terminal, based on which the communication connection between the second terminal 1910 and the first terminal 1913 is created.

In this exemplary embodiment, the terminal identifications are displayed, and the potential first terminal corresponding to the selection operation is determined as the first terminal, increasing the flexibility in determining the first terminal.

In an optional embodiment, in receiving the second display interface projected to the second terminal, the second processor is configured for sending to the first terminal a projection instruction corresponding to the virtual display screen, thereby receiving the second display interface projected to the second terminal.

Herein, the projection instruction may also be sent by the second terminal to the first terminal. When the first terminal receives the projection instruction sent by the second terminal, the second display interface displayed on the virtual display screen is projected to the second terminal.

For example, when the second terminal sends the projection instruction to the first terminal, the first terminal begins to project to the second terminal the second display interface corresponding to the virtual display screen, and at this time, the second terminal begins to receive the second display interface, thereby ensuring that the second display interface is subsequently displayed on the second display screen.

In this exemplary embodiment, the projection instruction may be sent by the second terminal to the first terminal, increasing the flexibility of generating the projection instruction.

In an optional embodiment, after displaying the second display interface, the second processor is configured for sending, to the first terminal in response to a touch control operation acting on the second display screen, touch control information corresponding to the touch control operation, thereby causing the first terminal to control the virtual display screen based on the touch control information.

Herein, the touch control operation refers to an operation of the user acting on the second display screen. Specifically, the touch control operation may be a click operation, a double-click operation, a long-press operation, or any kind of touch control operation, and this exemplary embodiment does not make any special limitations on this.

Figure 20:
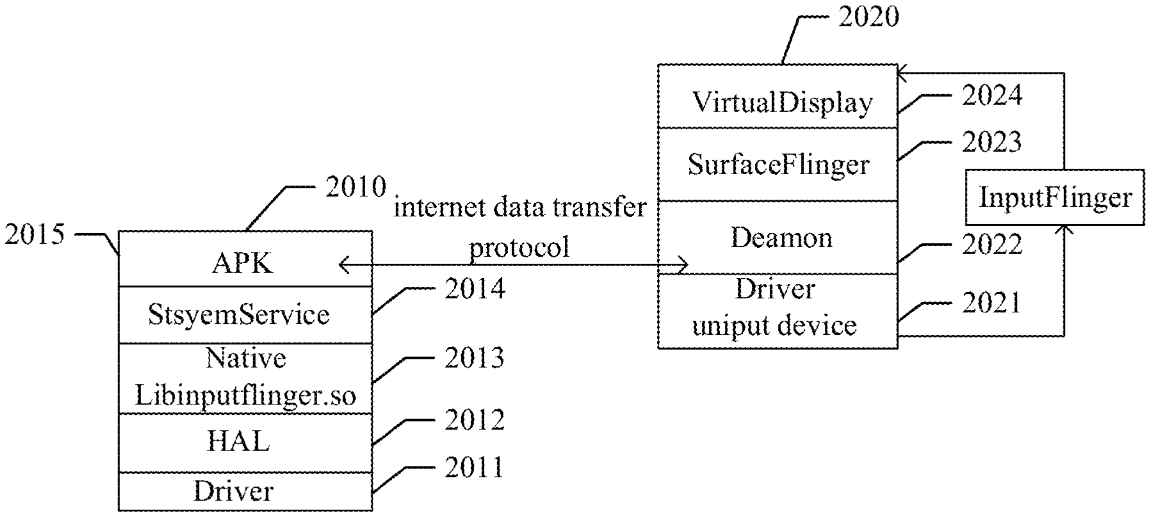
FIG. 20 schematically illustrates a framework diagram of a first terminal and a second terminal in a second terminal configured for screen projection in an embodiment of the present disclosure.

By way of example, FIG. 20 schematically illustrates a framework diagram of a first terminal and a second terminal. As shown in FIG. 20, the structure 2010 is a system hierarchy structure of the second terminal, and the structure 1820 is a system hierarchy structure of the first terminal.

In the structure 2010, there exists a driver (Driver) layer 2011, a hardware abstraction for interaction with driver layer (HAL) 2012, a native framework layer (Native layer) 2013, a system service layer (SystemService layer) 2014, and an application function kit (APK) layer 2015.

Herein, the touch control operation is captured by libinputflinger.so (a virtual key) in the Native layer, and the captured touch control operation is transmitted to the layer 2015 through the layer 2014. After receiving the touch control operation, the layer 2015 sends the touch control operation to the first terminal through the internet data transfer protocol. The reason why it is necessary to transmit the touch control operation to the layer 2015 through the layer 2014 is that the layer 2014 is used for converting the data transmitted by the underlying layer 2013 into the data that is capable of being directly used by the layer 2015.

In the structure 2020, there exists a virtual input device (Driver uniput device) layer 2021, a sprite virtual CD-ROM driver (Deamon) layer 2022, a screen synthesis layer (SurfaceFlinger) 1823, and a virtual display screen (VirtualDisplay) layer 2024. Herein, the layer 2023 is used for synthesizing different display interfaces. The CD-ROM driver 2022 is used for receiving the touch control operation sent to the first terminal through the internet data transfer protocol and simulating the touch control event in the layer 2021 based on touch control information corresponding to the touch control operation, in addition to which the layer 2021 sends the touch control event to the layer 2023 through the inputFlinger framework. The layer 2023 is used for receiving the touch control event and sending the touch control event to the layer 2024 in which the virtual display screen is located, thereby achieving control of the virtual display screen.

In this exemplary embodiment, the touch control information corresponding to the touch control operation is sent to the first terminal to enable the first terminal to control the virtual display screen based on the touch control information, ensuring that the process of controlling the virtual display screen in the first terminal may be performed through the second terminal.

Figure 21:
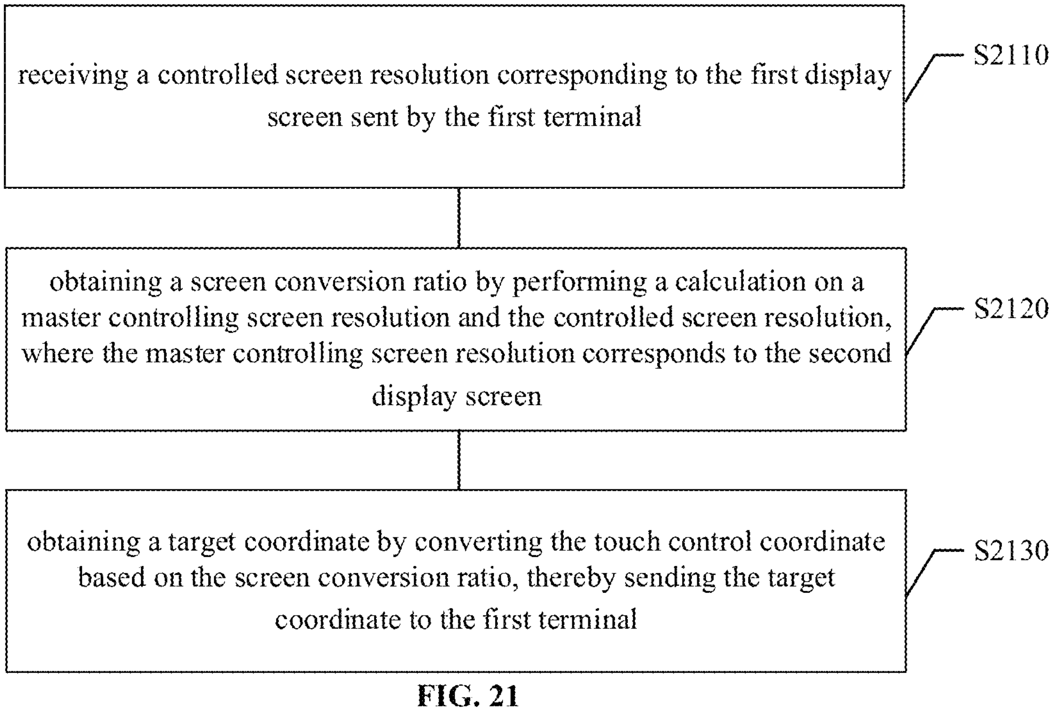
FIG. 21 schematically illustrates a flow diagram of sending to a first terminal touch control information corresponding to a touch control operation in a second terminal configured for screen projection in an embodiment of the present disclosure.

In an optional embodiment, FIG. 21 illustrates a flow diagram of sending to a first terminal touch control information corresponding to a touch control operation in a second terminal configured for screen projection. As shown in FIG. 21, the method at least includes the following steps S2110 to S2130. At step S2110, a controlled screen resolution corresponding to the first display screen sent by the first terminal is received.

Herein, when the user acts the touch control operation on the second display interface, the touch control coordinate corresponding to the touch control operation may be obtained. The touch control coordinate refers to a coordinate in the second display screen, and the coordinate is related to a position at which the touch control operation is acted upon.

After the communication connection between the first terminal and the second terminal is established, the second terminal may receive the controlled screen resolution corresponding to the first display screen, and the controlled screen resolution refers to a screen resolution of the first display screen. The screen resolution refers to the number of pixel points in the horizontal and vertical directions of the screen.

By way of example, the controlled screen resolution (Wb, Hb) corresponding to the first display screen sent by the first terminal is received.

At step S2120, a screen conversion ratio is obtained by performing a calculation on a master controlling screen resolution and the controlled screen resolution, where the master controlling screen resolution corresponds to the second display screen.

Herein, the master controlling screen resolution refers to a screen resolution of the second display screen, and based on this, the screen conversion ratio may be obtained by performing a division operation on the master controlling screen resolution and the controlled screen resolution.

By way of example, the screen conversion ratio (Wc, Hc) is obtained by performing the division operation on the master controlling screen resolution (Wa, Ha) and the controlled screen resolution (Wb, Hb), where $Wc=Wb/Wa$, and $Hc=Hb/Ha$.

At step S2130, a target coordinate is obtained by converting the touch control coordinate based on the screen conversion ratio, and the target coordinate is thereby sent to the first terminal.

Herein, since there is a resolution mismatch between the first terminal and the second terminal, only by converting the touch control coordinate based on the screen conversion ratio can the first terminal be accurately controlled through the second terminal.

For example, the touch control coordinate is (Xa, Ya), and the target coordinate (Xb, Yb) is obtained by converting the touch control coordinate based on the screen conversion ratio (Wc, Hc), where $Xb=Xa\times Wc$, and $Yb=Ya\times Hc$. Moreover, after the target coordinate is obtained, the target coordinate is sent to the first terminal, thereby realizing control of the first terminal screen.

In this exemplary embodiment, the target coordinate is obtained by converting the touch control coordinate based on the screen conversion ratio, avoiding the occurrence of a situation in which the second terminal is unable to accurately control the first terminal due to the existence of a resolution mismatch between the first terminal and the second terminal, and increasing the accuracy of the control of the second terminal over the first terminal.

Figure 22:
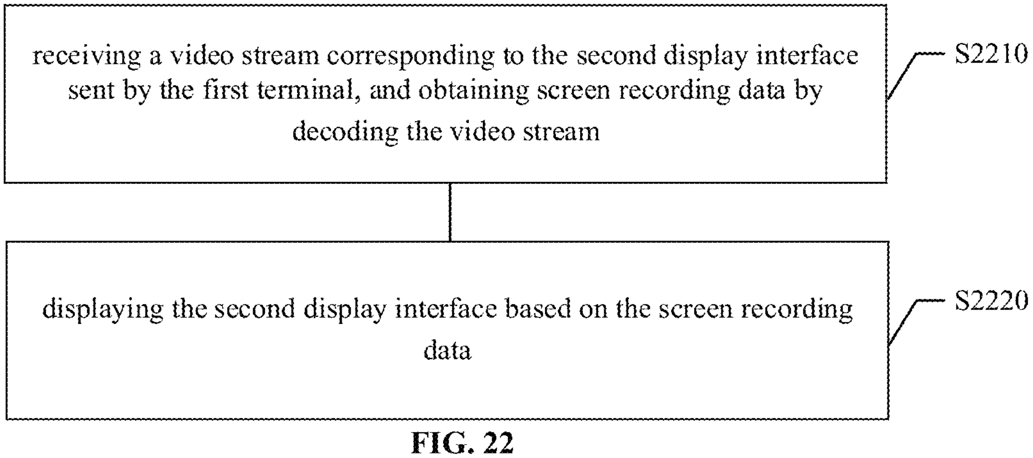
FIG. 22 schematically illustrates a flow diagram of displaying a second display interface in a second terminal configured for screen projection in an embodiment of the present disclosure.

In an optional embodiment, FIG. 22 illustrates a flow diagram of displaying a second display interface in a second terminal configured for screen projection. As shown in FIG. 22, the method at least includes the following steps S2210 to S2220. At step S2210, a video stream corresponding to the second display interface sent by the first terminal is received, and screen recording data is obtained by decoding the video stream.

Herein, in the process of displaying the second display interface by the second terminal, the video stream corresponding to the second display interface sent by the first terminal is first received, and then the video stream needs to be decoded to obtain the screen recording data of each frame in the video stream.

Figure 23:
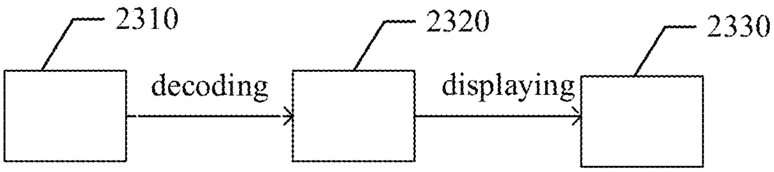
FIG. 23 schematically illustrates a process of decoding a video stream in a second terminal configured for screen projection in an embodiment of the present disclosure.

By way of example, FIG. 23 schematically illustrates a process of decoding a video stream. As described in FIG. 23, the video stream 2310 is the video stream corresponding to the second display interface sent by the first terminal. Specifically, the second terminal receives, based on H264 (a standard format of the coding layer of the video), the video stream corresponding to the second display interface sent by the first terminal; the data 2320 is the screen recording data, corresponding to each frame, that is obtained after decoding the video stream; and the interface 2330 is the second display interface displayed based on the screen recording data.

At step S2220, the second display interface is displayed based on the screen recording data.

Herein, after the screen recording data is obtained, the second display interface may be displayed on the second display screen by using the screen recording data.

By way of example, after the screen recording data is obtained, the second display interface is displayed on the second display screen based on the screen recording data.

In this exemplary embodiment, the video stream is decoded to obtain the screen recording data, and the second display interface is displayed based on the screen recording data, which ensures the displaying of the second display interface, and lays a foundation for the subsequent control of the first terminal by using the second terminal.

The present disclosure also provides a screen projection control system. The system includes a first terminal and a second terminal. The first terminal is communicatively connected to the second terminal. The first terminal includes a first processor and a first display screen. The second terminal includes a second processor and a second display screen. The first processor is configured for: generating a first display interface, and controlling the first display screen to display the first display interface; creating a virtual display screen; creating a second display interface, and controlling the virtual display screen to display the second display interface; and projecting to the second terminal the second display interface corresponding to the virtual display screen, thereby causing the second terminal to display the second display interface. The second processor is configured for: receiving the second display interface projected to the second terminal, and controlling the second display screen to display the second display interface.

Herein, the first terminal included in the system is consistent with the first terminal mentioned in the screen projection control method, and the second terminal included in the system is consistent with the second terminal mentioned in the screen projection control method. Correspondingly, the first processor and the first display screen are also consistent with the first processor and the first display screen mentioned in the screen projection control method, respectively; and the second processor and the second display screen are also consistent with the second processor and the second display screen mentioned in the screen projection control method, respectively.

The processing of the first processor is the same as that of the first processor in the screen projection control method, and the processing of the second processor is the same as that of the second processor in the screen projection control method, which will not be repeated herein.

In the system provided in the exemplary embodiments of the present disclosure, on the one hand, the first display screen is controlled to display the first display interface, the virtual display screen is created, and the virtual display screen is controlled to display the second display interface. The existence of the first display screen and the virtual display screen in the first terminal improves the utilization of the screen of the first terminal. On the other hand, the second display interface corresponding to the virtual display screen is projected to the second terminal, so that when the content displayed in the first terminal is changed, the user can see in the second terminal the second display interface that is displayed on the virtual display screen, and the display of the content of the interface cannot be interrupted, optimizing the user's viewing experience.

In an optional embodiment, in creating the virtual display screen, the first processor is configured for creating a floating window, and displaying, on the floating window by using the floating window as a carrier, the second display interface that is displayed on the virtual display screen.

Herein, the process of creating the virtual display screen is consistent with steps S210 and S220.

In this exemplary embodiment, the virtual display screen is displayed on the floating window by using the floating window as the carrier, causing that operations such as hiding/displaying, moving, and the like for the virtual display screen can be realized by adjusting the floating window subsequently.

In an optional embodiment, in displaying, on the floating window by using the floating window as the carrier, the virtual display screen, the first processor is configured for: determining a first screen identification corresponding to the virtual display screen, determining a first storage identification corresponding to the first screen identification, obtaining screen data from a first storage area corresponding to the first storage identification, and displaying on the floating window, based on the screen data, the second display interface that is displayed on the virtual display screen.

Herein, the process of displaying the virtual display screen on the floating window by using the floating window as the carrier is consistent with steps S310 and S320.

In an optional embodiment, the screen data is obtained from the storage area corresponding to the storage identification, the virtual display screen is displayed on the floating window based on the screen data, and the exact area displayed on the virtual display screen may be obtained from the storage area based on the storage identification.

In an optional embodiment, after creating the virtual display screen, the first processor is configured for assigning a first screen identification to the virtual display screen, where the first screen identification is different from a second screen identification, and the second screen identification is a screen identification assigned to the first display screen by the first processor.

Herein, the first screen identification and the second screen identification are consistent with the contents mentioned above and are not repeated herein.

In this exemplary embodiment, the first screen identification is assigned to the virtual display screen, and the first screen identification is different from the second screen identification. This lays a foundation for subsequently distinguishing the virtual display screen from the first display screen, and facilitates subsequent control of the virtual display screen by the second terminal.

In an optional embodiment, in creating the virtual display screen, the first processor is configured for obtaining a screen resolution corresponding to the second display screen sent by the second terminal, determining a target resolution of the virtual display screen based on the screen resolution, and creating the virtual display screen based on the target resolution.

Herein, the process of creating the virtual display screen is consistent with steps S410 and S420.

In this exemplary embodiment, the virtual display screen is created based on the target resolution, and the target resolution corresponds to the screen resolution, so that the resolution of the virtual display screen displayed in the first terminal is adapted to the resolution of the second display screen of the second terminal, which optimizes the degree of the user's experience of subsequent control.

In an optional embodiment, in controlling the virtual display screen to display the second display interface, the first processor is configured for: obtaining terminal type information sent by the second terminal, determining a landscape/portrait mode corresponding to the terminal type information, and displaying, based on the landscape/portrait mode, the second display interface on the virtual display screen.

Herein, the process of controlling the virtual display screen to display the second display interface is consistent with steps S510 and S520.

In this exemplary embodiment, the second display interface is displayed on the virtual display screen based on the landscape/portrait mode, and the landscape/portrait mode corresponds to the terminal type information, ensuring that the landscape/portrait mode in which the first terminal displays the second display interface is consistent with the landscape/portrait mode in which the second terminal displays the second display interface subsequently, which improves the viewing experience of the user.

In an optional embodiment, the first processor is configured for: determining, based on the terminal type information, a target display interface from a plurality of second display interfaces, where sizes of icons are different in the plurality of second display interfaces. The first processor is further configured for displaying the target display interface on the virtual display screen.

Herein, the process of displaying the target display interface on the virtual display screen is consistent with steps S610 and S620.

In this exemplary embodiment, the target display interface is displayed on the virtual display screen, and since the target display interface is determined from all the second display interfaces based on the terminal type information, the degree of adaptation of the icons on the target display interface to the terminal type information of the second terminal is improved, and the degree of viewing experience of the user is optimized.

In an optional embodiment, after the second terminal displays the second display interface, the first processor is configured for: if a hide/display instruction corresponding to the virtual display screen is obtained, hiding/displaying the floating window; if a move instruction corresponding to the virtual display screen is obtained, obtaining movement information corresponding to the move instruction, and moving the floating window based on the movement information; if a zoom-in/zoom-out instruction corresponding to the virtual display screen is obtained, determining an adjustment size corresponding to the zoom-in/zoom-out instruction, and adjusting window size information of the floating window based on the adjustment size.

Herein, the process after the second terminal displays the second display interface is consistent with step S710, step S720, step S730, step S740, and step S750.

In this exemplary embodiment, if the hide/display instruction corresponding to the virtual display screen is obtained, the floating window is hidden/displayed; if the move instruction corresponding to the virtual display screen is obtained, the floating window is moved based on the movement information corresponding to the move instruction; if the zoom-in/zoom-out instruction corresponding to the virtual display screen is obtained, the window size information of the floating window is adjusted, so that the user can control the virtual display screen based on different scenarios.

In an optional embodiment, in projecting to the second terminal the second display interface corresponding to the virtual display screen, the first processor is configured for: obtaining a projection instruction; if the projection instruction carries the first screen identification, determining the first storage identification corresponding to the first screen identification; and obtaining first screen recording data from the first storage area corresponding to the first storage identification, and projecting, to the second terminal by sending the first screen recording data to the second terminal, the second display interface corresponding to the virtual display screen.

Herein, the process of projecting to the second terminal the second display interface corresponding to the virtual display screen is consistent with step S810, step S820, and step S830.

In this exemplary embodiment, sending corresponding screen recording data to the second terminal based on the storage identification carried in the projection instruction realizes that the second display interface is projected to the second terminal, which is helpful for subsequent control of the virtual display screen through the second terminal, and avoids the situation of the prior art in which the content displayed on the virtual display screen needs to be interrupted when the content displayed on the virtual display screen is changed, optimizing the user's experience.

In an optional embodiment, in projecting, to the second terminal by sending the screen recording data to the second terminal, the second display interface corresponding to the virtual display screen, the first processor is configured for: obtaining, by encoding the first screen recording data, a video stream corresponding to the virtual display screen; and projecting, by sending the video stream to the second terminal, the second display interface to the second terminal.

Herein, the process of projecting to the second terminal the second display interface corresponding to the virtual display screen is consistent with steps S910 and S920.

In this exemplary embodiment, projecting the second display interface to the second terminal by sending the video stream to the second terminal is helpful for subsequent control of the virtual display screen in the first terminal by using the second terminal.

In an optional embodiment, after the second terminal displays the second display interface, the first processor is configured for: creating a first virtual input device corresponding to the virtual display screen; receiving first touch control information corresponding to the virtual display screen sent by the second terminal; simulating, based on the first virtual input device, a first touch control event corresponding to the first touch control information, thereby sending the first touch control event to the virtual display screen; and controlling the second display interface based on the first touch control event.

Herein, the process after the second terminal displays the second display interface is consistent with step S1110, step S1120, step S1130, and step S1140.

In this exemplary embodiment, on the one hand, the first virtual input device is created to avoid a situation in which the touch control information only acts on the first display interface; on the other hand, the touch control event corresponding to the touch control information is simulated, and the second display interface is controlled based on the touch control event, realizing the process of controlling the first terminal by using the second terminal.

In an optional embodiment, a number of the second terminal is multiple, and the first processor is configured for: if the number of the second terminal is multiple, determining a third terminal and a fourth terminal from multiple second terminals; creating, by projecting to the third terminal the first display interface corresponding to the first display screen, a first control relationship between the third terminal and the first display interface; and creating, by projecting to the fourth terminal the second display interface corresponding to the virtual display screen, a second control relationship between the fourth terminal and the second display interface.

Herein, creating the control relationship between the second terminal and the virtual display screen is consistent with step S1210, step S1220, and step S1230.

In this exemplary embodiment, if the number of the second terminals is multiple, the third terminal and the fourth terminal are determined from the multiple second terminals, the first display interface is projected to the third terminal, and the second display interface is projected to the fourth terminal, which increases the flexibility of controlling the first display interface and the second display interface.

In an optional embodiment, in generating the first display interface, and controlling the first display screen to display the first display interface, the first processor is configured for: determining the first display interface corresponding to a first application; obtaining a first screen identification corresponding to the first display screen, and determining a first storage identification corresponding to the first screen identification; and controlling, by storing to a first storage area first interface data corresponding to the first display interface, the first display screen to display the first display interface, where the first storage area corresponds to the first storage identification.

Herein, the process of controlling the first display screen to display the first display interface is consistent with step S1310, step S1320, and step S1330.

In this exemplary embodiment, storing the first interface data to the first storage area not only controls the first display screen to display the first display interface, but also lays, by storing the corresponding interface data in the corresponding storage area, a foundation for subsequently displaying different display interfaces on different display screens.

In an optional embodiment, in creating the second display interface, and controlling the virtual display screen to display the second display interface, the first processor is configured for: determining the second display interface corresponding to the first application; obtaining a second screen identification corresponding to the virtual display screen, and determining a second storage identification corresponding to the second screen identification; and controlling, by storing to a second storage area second interface data corresponding to the second display interface, the virtual display screen to display the second display interface, where the second storage area corresponds to the second storage identification.

Herein, the process of controlling the virtual display screen to display the second display interface is consistent with step S1410, step S1420, and step S1430.

In this exemplary embodiment, storing to the second storage area the second storage data corresponding to the second display interface realizes displaying the second display interface on the virtual display screen, and since the second display interface corresponds to the first application, dual-screen heterodyne displaying is thereby realized, which enables the user to see in the first terminal two display interfaces belonging to the same application at the same time, optimizing the user's experience.

In an optional embodiment, in creating the second display interface, and controlling the virtual display screen to display the second display interface, the first processor is configured for: determining the second display interface corresponding to a second application; obtaining a second screen identification corresponding to the virtual display screen, and determining a second storage identification corresponding to the second screen identification; and controlling, by storing to a second storage area second interface data corresponding to the second display interface, the virtual display screen to display the second display interface, where the second storage area corresponds to the second storage identification.

Herein, the process of controlling the virtual display screen to display the second display interface is consistent with step S1510, step S1520, and step S1530.

In this exemplary embodiment, storing to the second storage area the second storage data corresponding to the second display interface realizes displaying the second display interface on the virtual display screen, and since the second display interface corresponds to the second application, the display interfaces of the dual applications are thereby displayed in the first terminal, which enables the user to see in the first terminal two display interfaces belonging to different applications at the same time, optimizing the user's experience.

In an optional embodiment, in creating the virtual display screen, the first processor is configured for creating the virtual display screen in response to a screen creation operation acting on the first display screen.

Herein, the screen creation operation refers to an operation for creating the virtual display screen, and the operation may be an operation of the user acting on the first display screen. Specifically, the screen creation operation may be a click operation, a double-click operation, or a long-press operation, and this exemplary embodiment does not make any special limitations on this.

For example, in response to a double-click operation acting on an application B on the first display screen, a function SurfaceControl.createDisplay( ) is utilized to create the virtual display screen.

In this exemplary embodiment, the screen creation operation may be an operation acting on the first display screen. The user may realize the creation of the virtual display screen by touching the first display screen, which increases flexibility of creating the virtual display screen.

In an optional embodiment, in creating the virtual display screen, the first processor is configured for receiving a screen creation instruction sent by the second terminal, and creating the virtual display screen based on the screen creation instruction.

Herein, the screen creation instruction may also be sent by the second terminal to the first terminal.

For example, when the user acts a click operation on a creation control of the second terminal, the screen creation instruction corresponding to the operation is sent to the first terminal at this time. After receiving the screen creation instruction, the first terminal creates the virtual display screen.

In this exemplary embodiment, the screen creation instruction may be sent by the second terminal to the first terminal, which not only realizes the creation of the virtual display screen, but also increases the flexibility of creating the virtual display screen.

In an optional embodiment, the first processor is configured for: if a screen identification carried in the projection instruction is consistent with a second screen identification, determining a second storage identification corresponding to the second screen identification, obtaining second screen recording data from a second storage area corresponding to the second storage identification, and projecting, to the second terminal by sending the second screen recording data to the second terminal, the first display interface corresponding to the first display screen.

Herein, the above process is consistent with steps S1610 and S1620 and will not be repeated herein.

In this exemplary embodiment, sending corresponding the second screen recording data to the second terminal based on the second screen identification carried in the projection instruction realizes that the first display interface is projected to the second terminal, which is helpful for subsequent control of the first display screen through the second terminal, and avoids the situation of the prior art in which the content displayed on the first display screen needs to be interrupted when the content displayed on the first display screen is changed, optimizing the user's experience.

Figure 24:
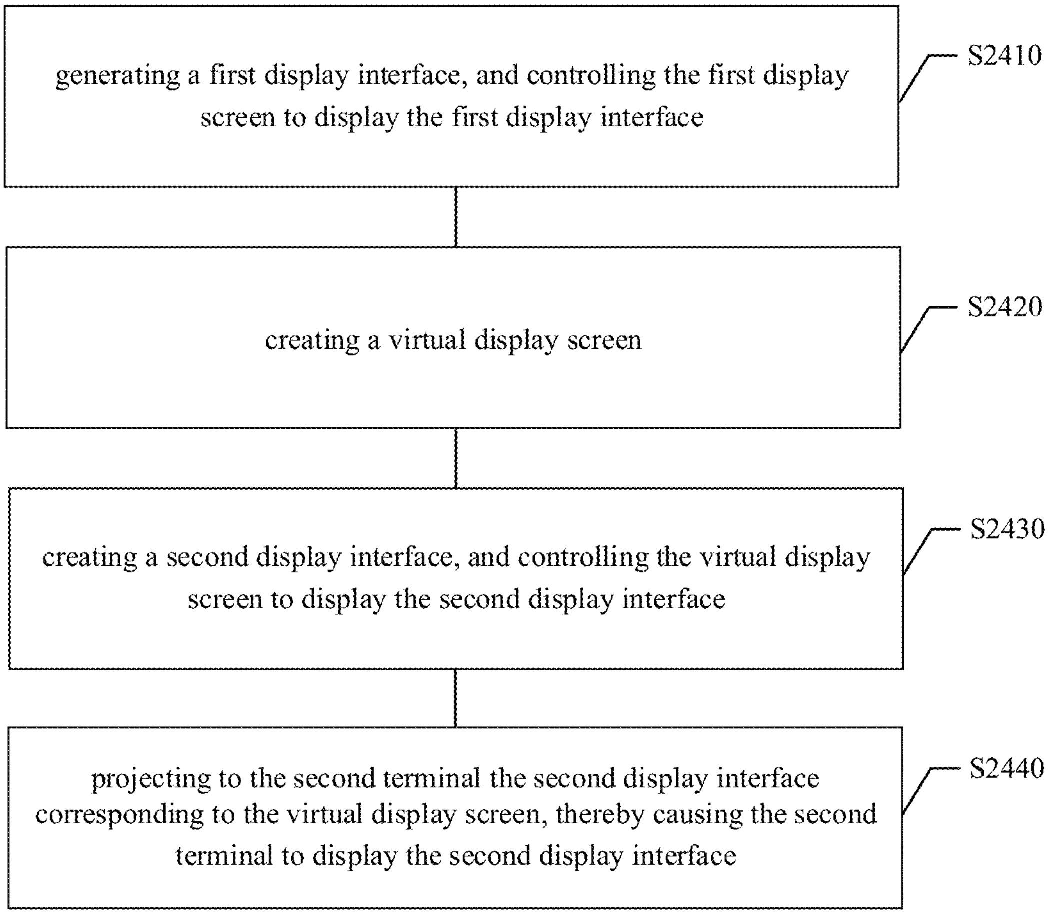
FIG. 24 schematically illustrates a flow diagram of a screen projection control method in an embodiment of the present disclosure.

The present disclosure proposes a screen projection control method. FIG. 24 illustrates a flow diagram of a screen projection control method. As shown in FIG. 24, the screen projection control method at least includes the following steps S2410 to 2440.

At step S2410, a first display interface is generated, and a first display screen is controlled to display the first display interface.

At step S2420, a virtual display screen is created.

At step S2430, a second display interface is created, and the virtual display screen is controlled to display the second display interface.

At step S2440, the second display interface corresponding to the virtual display screen is projected to the second terminal, thereby causing the second terminal to display the second display interface.

In the method and device provided in the exemplary embodiments of the present disclosure, on the one hand, the first display screen is controlled to display the first display interface, the virtual display screen is created, and the virtual display screen is controlled to display the second display interface. The existence of the first display screen and the virtual display screen in the first terminal improves the utilization of the screen of the first terminal. On the other hand, the second display interface corresponding to the virtual display screen is projected to the second terminal, so that when the content displayed in the first terminal is changed, the user can see in the second terminal the second display interface that is displayed on the virtual display screen, and the display of the content of the interface cannot be interrupted, optimizing the user's viewing experience.

Herein, step S2410 corresponds to step S110, step S2420 corresponds to step S120, step S2430 corresponds to step S130, and step S2440 corresponds to step S140. Based on this, the corresponding explanation section has been pointed out in the foregoing section, and thus will not be repeated.

The present disclosure proposes a screen projection control method. The screen projection control method is applied to a second terminal. The second terminal includes a second display screen. The second terminal is communicatively connected to a first terminal. The method includes: receiving a second display interface projected to the second terminal, and displaying the second display interface. The second display interface is displayed on a virtual display screen. The virtual display screen is created by the first terminal. The first terminal further generates a first display interface and controls a first display screen to display the first display interface.

Herein, the second terminal is a terminal communicatively connected to the first terminal. Generally, the second terminal is a mobile terminal. Specifically, the second terminal may be a cell phone terminal, a tablet terminal, or any kind of mobile terminal, and this exemplary embodiment does not make any special limitations on this.

The second terminal includes the second processor and the second display screen. The second processor receives the second display interface projected to the second terminal, and then displays the second display interface on the second display screen. It is worth stating that the second display interface is an interface displayed on the virtual display screen, and the virtual display screen is another display screen created by the first terminal on the basis of the first display screen.

By way of example, the second display interface projected to the second terminal is received, and specifically, the second display interface may be a management interface of an application B, and the management interface of the application B is then displayed on the second display screen, which is helpful for subsequent controlling of the second display interface in the first terminal through the second terminal.

In the method and device provided in the exemplary embodiments of the present disclosure, the second display interface projected to the second terminal is received, which lays a foundation for subsequent control of the first terminal by using the second terminal.

The present disclosure proposes a screen projection control method. The method is used for a screen projection control system. The screen projection control system includes a first terminal and a second terminal. The first terminal is communicatively connected to the second terminal. The first terminal includes a first display screen. The second terminal includes a second display screen. The first terminal is configured for: generating a first display interface, and controlling the first display screen to display the first display interface; creating a virtual display screen; creating a second display interface, and controlling the virtual display screen to display the second display interface; and projecting to the second terminal the second display interface corresponding to the virtual display screen, thereby causing the second terminal to display the second display interface. The second terminal is configured for: receiving the second display interface projected to the second terminal, and controlling the second display screen to display the second display interface.

Herein, the above process is the same as step S110, step S120, step S130, step S140, and the process of the second processor regarding how to display the second display interface, and will not be repeated.

In this exemplary embodiment, on the one hand, the first display screen is controlled to display the first display interface, the virtual display screen is created, and the virtual display screen is controlled to display the second display interface. The existence of the first display screen and the virtual display screen in the first terminal improves the utilization of the screen of the first terminal. On the other hand, the second display interface corresponding to the virtual display screen is projected to the second terminal, so that when the content displayed in the first terminal is changed, the user can see in the second terminal the second display interface that is displayed on the virtual display screen, and the display of the content of the interface cannot be interrupted, optimizing the user's viewing experience.

The following is a detailed description of the screen projection control method in the embodiments of the present disclosure in combination with an application scenario.

The first terminal is a large-size terminal X-12 in a conference room, and the second terminal is a cell phone in hands of an office worker. At this time, a video conference interface is displayed in the large-size terminal X-12, and a virtual display screen is created. A conference recording interface is created, the conference recording interface is displayed on the second display interface, and the conference recording interface is projected to the cell phone, causing that the conference recording interface is displayed in the cell phone as well.

In this application scenario, on the one hand, the first display screen is controlled to display the first display interface, the virtual display screen is created, and the virtual display screen is controlled to display the second display interface. The existence of the first display screen and the virtual display screen in the first terminal improves the utilization of the screen of the first terminal. On the other hand, the second display interface corresponding to the virtual display screen is projected to the second terminal, so that when the content displayed in the first terminal is changed, the user can see in the second terminal the second display interface that is displayed on the virtual display screen, and the display of the content of the interface cannot be interrupted, optimizing the user's viewing experience.

An electronic device 2500 according to an embodiment of the present invention is described below with reference to FIG. 25. The electronic device 2500 shown in FIG. 25 is merely an example and should not bring about any limitation on the functions and scope of use of the embodiment of the present disclosure.

Figure 25:
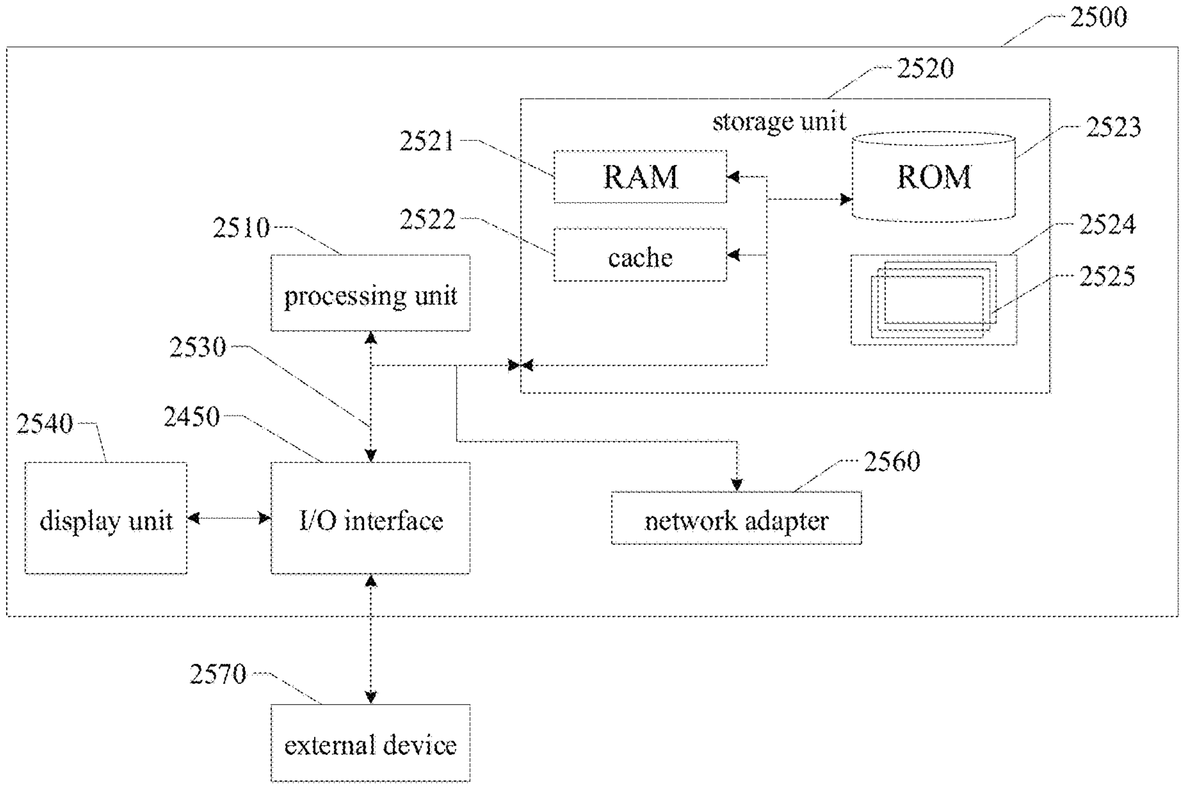
FIG. 25 schematically illustrates an electronic device configured for a screen projection control method in an embodiment of the present disclosure.

As shown in FIG. 25, the electronic device 2500 is represented in the form of a general purpose computing device. Components of the electronic device 2500 may include, but are not limited to, at least one processing unit 2510 as described above, at least one storage unit 2520 as described above, a bus 2530 connecting different system components including the storage unit 2520 and the processing unit 2510, and a display unit 2540.

The memory unit stores program code. The program code is capable of being executed by the processing unit 2510, causing the processing unit 2510 to perform the steps according to various exemplary embodiments of the present disclosure described in the above-described “exemplary method” section of this specification.

The storage unit 2520 may include a readable medium in the form of a volatile storage unit, such as a random access memory unit (RAM) 2521 and/or a cache memory unit 2522, and may further include a read-only storage unit (ROM) 2523.

The storage unit 2520 may also include a program/usage tool 2524 having a set (at least one) of program modules 2525, such program modules 2525 include, but are not limited to, an operating system, one or more application programs, other program modules, and program data, and reality of a network environment may be included in each of these examples or a certain combination thereof.

The bus 2530 may be one or more of several types of bus structures, including storage unit buses, storage unit controllers, peripheral buses, graphics acceleration ports, processing units, or local area buses using any of the various bus structures.

The electronic device 2500 may also be in communication with one or more external devices 2570 (e.g., a keyboard, a pointing device, a Bluetooth device, etc.), and may also be in communication with one or more devices that enable the user to interact with the electronic device 2500, and/or may be in communication with any device (e.g., a router, a modem, etc.) that enables the electronic device 2500 to communicate with one or more other computing devices. Such communication may be carried out via an input/output (I/O) interface 2550. Moreover, the electronic device 2500 may also communicate with one or more networks (e.g., a local area network (LAN), a wide area network (WAN), and/or a public network, such as the Internet) via a network adapter 2560. As shown in the drawing, the network adapter 2560 communicates with other modules of the electronic device 2500 via the bus 2530. It should be understood that, although not shown in the drawings, other hardware and/or software modules may be used in conjunction with the electronic device 2500, including, but not limited to, microcode, device drivers, redundant processing units, external disk drive arrays, RAID systems, tape drivers, and data backup storage systems, etc.

Through the above description of the embodiments, it is readily understood by those skilled in the art that the example embodiments described herein may be implemented by software or may be implemented by software in combination with the necessary hardware. Thus, technical solutions according to the embodiments of the present disclosure may be embodied in the form of a software product. The software product may be stored in a non-volatile storage medium (which may be a CD-ROM, a U disk, a removable hard drive, etc.) or on a network, and include a number of instructions to cause a computing device (which may be a personal computer, a server, a terminal device, or a network device, etc.) to perform the method according to the embodiments of the present disclosure.

In an exemplary embodiment of the present disclosure, a computer-readable storage medium is also provided. The computer-readable storage medium stores a program product capable of implementing the method described above in this specification. In some possible embodiments, aspects of the present disclosure may also be realized in the form of a program product that includes program code. When the program product is run on a terminal device, the program code is used for causing the terminal device to perform the steps according to various exemplary embodiments of the present disclosure described in the above-described “exemplary method” section of this specification.

Figure 26:
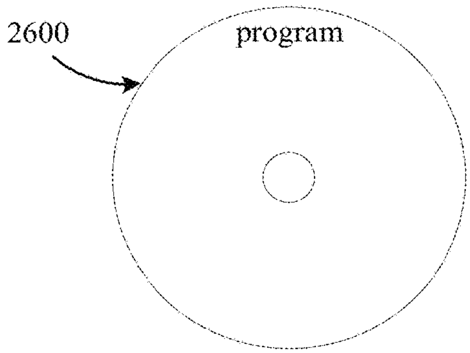
FIG. 26 schematically illustrates a computer non-transient readable storage medium used for a screen projection control method in an embodiment of the present disclosure.

Referring to FIG. 26, a program product 2600 used for implementing the above method according to an embodiment of the present disclosure is described. The program product 2600 may be in the form of a portable compact disc read-only memory (CD-ROM) and include program code, and may be run on a terminal device, such as a personal computer. However, the program product of the present disclosure is not limited thereto. In this document, a readable storage medium may be any tangible medium that contains or stores a program, and the program may be used by or in combination with an instruction execution system, apparatus or device.

The program product may use any combination of one or more readable media. The readable medium may be a readable signal medium or a readable storage medium. For example, the readable storage medium may be, but not limited to, a system, apparatus, or device that is electrical, magnetic, optical, electromagnetic, infrared, or semiconductor, or any combination of the above. More specific examples of the readable storage medium (a non-exhaustive list) include: an electrical connection having one or more wires, a portable disc, a hard disc, a random access memory (RAM), a read-only memory (ROM), an erasable programmable read-only memory (EPROM or flash memory), a fiber optic, a portable compact disc read-only memory (CD-ROM), an optical storage device, a magnetic storage device, or any suitable combination of the foregoing.

The computer readable signal medium may include a data signal propagated in the baseband or as part of a carrier, and the data signal carries readable program code. Such propagated data signal may take a variety of forms, including, but not limited to, an electromagnetic signal, an optical signal, or any suitable combination of the foregoing. The readable signal medium may also be any readable medium other than a readable storage medium, and the readable medium may send, propagate, or transmit a program for use by, or in conjunction with, an instruction execution system, apparatus, or device.

The program code included in the readable medium may be transmitted by using any suitable medium including, but not limited to, wireless medium, wired medium, fiber optic cable, RF, etc., or any suitable combination of the foregoing.

The program code used for performing the operations of the present disclosure may be written in any combination of one or more programming languages, and the programming languages include object-oriented programming languages such as Java, C++, etc., and conventional procedural programming languages such as the “C” language or similar programming languages. The program code may be executed entirely on the user computing device, executed partially on the user device, executed as a stand-alone software package, executed partially on the user computing device and partially on a remote computing device, or executed entirely on a remote computing device or a server. In situations involving the remote computing device, the remote computing device may be connected to the user computing device via any kind of network, including a local area network (LAN) or a wide area network (WAN), alternatively, the remote computing device may be connected to an external computing device (e.g., by using an Internet service provider to connect via the Internet).

After considering the specification and practicing the present disclosure herein, those skilled in the art will easily come up with other embodiments of the present disclosure. The purpose of the present application is to cover any variations, uses, or adaptations of the present disclosure, and these variations, uses, or adaptations follow the general principles of the present disclosure and include common knowledge or commonly used technical means in the art that are not disclosed in the present disclosure. The specification and embodiments are only considered exemplary, and the true scope and spirit of the present disclosure are indicated by the accompanying claims.

What is claimed is:

1. A first terminal configured for screen projection, wherein the first terminal comprises a first processor and a first display screen, the first terminal is communicatively connected to a second terminal, and the first processor is configured for:
   generating a first display interface, and controlling the first display screen to display the first display interface;
   creating a virtual display screen;
   creating a second display interface, and controlling the virtual display screen to display the second display interface; and
   projecting to the second terminal the second display interface corresponding to the virtual display screen, thereby causing the second terminal to display the second display interface;
   wherein in the controlling the virtual display screen to display the second display interface, the first processor is configured for:
   creating a floating window, wherein the floating window is a moveable window displayed in the first terminal, and is configured to display the second display interface that is projected to the second terminal; and
   displaying, on the floating window by using the floating window as a carrier, the second display interface that is displayed on the virtual display screen;
   wherein in the controlling the virtual display screen to display the second display interface, the first processor is configured for:
   obtaining terminal information sent by the second terminal, and determining a landscape/portrait mode corresponding to the terminal information; and
   displaying, based on the landscape/portrait mode, the second display interface on the virtual display screen.

2. The first terminal configured for screen projection according to claim 1, wherein after the creating the virtual display screen, the first processor is configured for:
   assigning a first screen identification to the virtual display screen, wherein the first screen identification is different from a second screen identification, and the second screen identification is a screen identification assigned to the first display screen by the first processor.

3. The first terminal configured for screen projection according to claim 1, wherein in the creating the virtual display screen, the first processor is configured for:
   obtaining a screen resolution corresponding to a second display screen sent by the second terminal, and determining a target resolution of the virtual display screen based on the screen resolution; and
   creating the virtual display screen based on the target resolution.

4. The first terminal configured for screen projection according to claim 1, wherein in the displaying, on the floating window by using the floating window as the carrier, the second display interface that is displayed on the virtual display screen, the first processor is configured for:
   determining a first screen identification corresponding to the virtual display screen, and determining a first storage identification corresponding to the first screen identification; and
   obtaining screen data from a first storage area corresponding to the first storage identification, and displaying on the floating window, based on the screen data, the second display interface that is displayed on the virtual display screen.

5. The first terminal configured for screen projection according to claim 4, wherein in the projecting to the second terminal the second display interface corresponding to the virtual display screen, the first processor is configured for:
   obtaining a projection instruction;
   determining, in response to the projection instruction carrying the first screen identification, the first storage identification corresponding to the first screen identification; and
   obtaining first screen recording data from the first storage area corresponding to the first storage identification, and projecting, to the second terminal by sending the first screen recording data to the second terminal, the second display interface corresponding to the virtual display screen.

6. The first terminal configured for screen projection according to claim 5, wherein in the projecting, to the second terminal by sending the first screen recording data to the second terminal, the second display interface corresponding to the virtual display screen, the first processor is configured for:
   obtaining, by encoding the first screen recording data, a video stream corresponding to the virtual display screen; and
   projecting, by sending the video stream to the second terminal, the second display interface to the second terminal.

7. The first terminal configured for screen projection according to claim 5, wherein the first processor is configured for:
   determining, in response to a screen identification carried in the projection instruction being consistent with a second screen identification, a second storage identification corresponding to the second screen identification; and
   obtaining second screen recording data from a second storage area corresponding to the second storage identification, and projecting, to the second terminal by sending the second screen recording data to the second terminal, the first display interface corresponding to the first display screen; wherein
   after the projecting to the second terminal the first display interface corresponding to the first display screen, the first processor is configured for:
   creating a second virtual input device corresponding to the first display screen;
   receiving second touch control information corresponding to the first display screen sent by the second terminal;
   simulating, based on the second virtual input device, a second touch control event corresponding to the second touch control information, thereby sending the second touch control event to the virtual display screen; and
   controlling the second display interface based on the second touch control event.

8. The first terminal configured for screen projection according to claim 1, wherein the first processor is configured for:

determining, based on the terminal information, a target display interface from a plurality of second display interfaces; wherein the plurality of second display interfaces are pre-stored, and sizes of icons are different in the plurality of second display interfaces; and displaying the target display interface on the virtual display screen.

9. The first terminal configured for screen projection according to claim 1, wherein after the second terminal displays the second display interface, the first processor is configured for:

hiding/displaying the floating window in response to obtaining a hide/display instruction corresponding to the virtual display screen;

obtaining, in response to obtaining a move instruction corresponding to the virtual display screen, movement information corresponding to the move instruction; and moving the floating window based on the movement information; or determining, in response to obtaining a zoom-in/zoom-out instruction corresponding to the virtual display screen, an adjustment size corresponding to the zoom-in/zoom-out instruction;

and adjusting window size information of the floating window based on the adjustment size.

10. The first terminal configured for screen projection according to claim 1, wherein after the second terminal displays the second display interface, the first processor is configured for:

creating a first virtual input device corresponding to the virtual display screen;

receiving first touch control information corresponding to the virtual display screen sent by the second terminal;

simulating, based on the first virtual input device, a first touch control event corresponding to the first touch control information, thereby sending the first touch control event to the virtual display screen; and controlling the second display interface based on the first touch control event;

or a number of the second terminal is multiple, and the first processor is configured for:

determining a third terminal and a fourth terminal from multiple second terminals;

creating, by projecting to the third terminal the first display interface corresponding to the first display screen, a first control relationship between the third terminal and the first display interface; and creating, by projecting to the fourth terminal the second display interface corresponding to the virtual display screen, a second control relationship between the fourth terminal and the second display interface.

11. The first terminal configured for screen projection according to claim 1, wherein in the generating the first display interface, and controlling the first display screen to display the first display interface, the first processor is configured for:

determining the first display interface corresponding to a first application;

obtaining a first screen identification corresponding to the first display screen, and determining a first storage identification corresponding to the first screen identification; and controlling, by storing to a first storage area first interface data corresponding to the first display interface, the first display screen to display the first display interface, wherein the first storage area corresponds to the first storage identification.

12. The first terminal configured for screen projection according to claim 11, wherein in the creating the second display interface, and controlling the virtual display screen to display the second display interface, the first processor is configured for:

determining the second display interface corresponding to the first application;

obtaining a second screen identification corresponding to the virtual display screen, and determining a second storage identification corresponding to the second screen identification; and controlling, by storing to a second storage area second interface data corresponding to the second display interface, the virtual display screen to display the second display interface, wherein the second storage area corresponds to the second storage identification;

or in the creating the second display interface, and controlling the virtual display screen to display the second display interface, the first processor is configured for:

determining the second display interface corresponding to a second application;

obtaining a second screen identification corresponding to the virtual display screen, and determining a second storage identification corresponding to the second screen identification; and controlling, by storing to a second storage area second interface data corresponding to the second display interface, the virtual display screen to display the second display interface, wherein the second storage area corresponds to the second storage identification.

13. The first terminal configured for screen projection according to claim 1, wherein in the creating the virtual display screen, the first processor is configured for:

creating the virtual display screen in response to a screen creation operation acting on the first display screen;

or in the creating the virtual display screen, the first processor is configured for:

receiving a screen creation instruction sent by the second terminal, and creating the virtual display screen based on the screen creation instruction.

14. A second terminal configured for screen projection configured for screen projection, wherein the second terminal comprises a second processor and a second display screen, the second terminal is communicatively connected to a first terminal, and the second processor is configured for:

receiving a second display interface projected to the second terminal, and displaying the second display interface, wherein the second display interface is displayed on a virtual display screen, the virtual display screen is created by a first processor of the first terminal, the first processor further generates a first display interface and controls a first display screen to display the first display interface, the first processor creates a floating window, the floating window is a moveable window displayed in the first terminal and is configured to display the second display interface that is projected to the second terminal, and the second display interface that is displayed on the virtual display screen is displayed on the floating window by using the floating window as a carrier;

wherein the second processor is configured for sending terminal information to the first terminal, causing the first processor to determine a landscape/portrait mode corresponding to the terminal information and display, based on the landscape/portrait mode, the second display interface on the virtual display screen.

15. The second terminal configured for screen projection according to claim 14, wherein the second processor is configured for:

sending to all potential first terminals first address information corresponding to the second terminal, thereby receiving second address information and terminal identifications sent by all the potential first terminals;

displaying the terminal identifications; and determining, in response to a selection operation acting on a terminal identification, a potential first terminal corresponding to the selection operation as the first terminal, thereby creating a communication connection between the second terminal and the first terminal.

16. The second terminal configured for screen projection according to claim 14, wherein after the displaying the second display interface, the second processor is configured for:

sending, to the first terminal in response to a touch control operation acting on the second display screen, touch control information corresponding to the touch control operation, thereby causing the first terminal to control the virtual display screen based on the touch control information; wherein the touch control information comprises a touch control coordinate;

in the sending to the first terminal the touch control information corresponding to the touch control operation, the second processor is configured for:

receiving a controlled screen resolution corresponding to the first display screen sent by the first terminal;

obtaining a screen conversion ratio by performing a calculation on a master controlling screen resolution and the controlled screen resolution, wherein the master controlling screen resolution corresponds to the second display screen; and obtaining a target coordinate by converting the touch control coordinate based on the screen conversion ratio, thereby sending the target coordinate to the first terminal.

17. A screen projection control method, applied to a first terminal, wherein the first terminal comprises a first display screen, the first terminal is communicatively connected to a second terminal, and the method comprises:

generating a first display interface, and controlling the first display screen to display the first display interface;

creating a virtual display screen;

creating a second display interface, and controlling the virtual display screen to display the second display interface; and projecting to the second terminal the second display interface corresponding to the virtual display screen, thereby causing the second terminal to display the second display interface;

wherein the controlling the virtual display screen to display the second display interface comprises:

creating a floating window, wherein the floating window is a moveable window displayed in the first terminal, and is configured to display the second display interface that is projected to the second terminal; and displaying, on the floating window by using the floating window as a carrier, the second display interface that is displayed on the virtual display screen;

wherein controlling the virtual display screen to display the second display interface comprises:

obtaining terminal information sent by the second terminal, and determining a landscape/portrait mode corresponding to the terminal information; and displaying, based on the landscape/portrait mode, the second display interface on the virtual display screen.

18. An electronic device, comprising:

a processor; and a memory, configured for storing an executable instruction of the processor; wherein the processor is configured to perform, through executing the executable instruction, the screen projection control method according to claim 17.

* * * * *